(12) United States Patent
Miyake et al.

(10) Patent No.: US 10,791,665 B2
(45) Date of Patent: Oct. 6, 2020

(54) TREE PLANTING SYSTEM, TREE PLANTING METHOD, CULTIVATING MACHINE, TREE PLANTING MACHINE, AND MANAGEMENT DEVICE

(71) Applicant: Komatsu Ltd., Tokyo (JP)

(72) Inventors: Toshio Miyake, Tokyo (JP); Hirokazu Asaka, Tokyo (JP)

(73) Assignee: KOMATSU LTD., Tokyo (JP)

(*) Notice: Subject to any disclaimer, the term of this patent is extended or adjusted under 35 U.S.C. 154(b) by 79 days.

(21) Appl. No.: 15/778,718

(22) PCT Filed: Jan. 25, 2017

(86) PCT No.: PCT/JP2017/002542
§ 371 (c)(1),
(2) Date: May 24, 2018

(87) PCT Pub. No.: WO2017/131029
PCT Pub. Date: Aug. 3, 2017

(65) Prior Publication Data
US 2018/0343784 A1    Dec. 6, 2018

(30) Foreign Application Priority Data
Jan. 29, 2016   (JP) .................................. 2016-016472

(51) Int. Cl.
*A01B 69/04*    (2006.01)
*A01G 23/02*    (2006.01)
(Continued)

(52) U.S. Cl.
CPC ............ *A01B 69/008* (2013.01); *A01B 69/02* (2013.01); *A01B 79/02* (2013.01); *A01C 11/02* (2013.01);
(Continued)

(58) Field of Classification Search
CPC ....... A01B 69/008; A01B 69/02; A01B 79/02; A01C 11/02; A01C 11/006; A01C 21/005;
(Continued)

(56) References Cited

U.S. PATENT DOCUMENTS 6,164,223 A     12/2000  Eriksson
6,941,225 B2 *  9/2005   Upadhyaya .......... A01B 79/005
                                                    56/10.2 A
(Continued)

FOREIGN PATENT DOCUMENTS

DE    19961442 A1 *   7/2001
JP    09-107717 A     4/1997
(Continued)

OTHER PUBLICATIONS

International Search Report dated Mar. 14, 2017, issued for PCT/JP2017/002542.

*Primary Examiner* — Michael J Zanelli
(74) *Attorney, Agent, or Firm* — Locke Lord LLP

(57) ABSTRACT

A first machine of a tree planting system includes: a cultivator cultivating soil where a plant for tree planting is to be planted; a first traveling device traveling with the cultivator; and a cultivated position detector obtaining and outputting actual cultivated positions corresponding to positions of the cultivator while the cultivator travels with the first traveling device and cultivates the soil. A management device of the tree planting system stores actual cultivated positions. A second machine of the tree planting system includes: a planting device planting a plant in the soil; a second traveling device traveling with the planting device; a planting device position detector obtaining a position of the planting device; and a controller controlling a position of the planting device based on: actual cultivated positions acquired from
(Continued)

the management device; and the position of the planting device at the timing when a plant is planted.

9 Claims, 16 Drawing Sheets

(51) Int. Cl.
| | | |
|---|---|---|
| *A01C 21/00* | (2006.01) | |
| *G05D 1/02* | (2020.01) | |
| *A01B 69/02* | (2006.01) | |
| *A01B 79/02* | (2006.01) | |
| *A01C 11/02* | (2006.01) | |
| *A01C 11/00* | (2006.01) | |

(52) U.S. Cl.
CPC ............ *A01C 21/005* (2013.01); *A01G 23/02* (2013.01); *G05D 1/02* (2013.01); *G05D 1/0293* (2013.01); *A01C 11/006* (2013.01); *G05D 2201/0201* (2013.01); *Y02A 40/243* (2018.01); *Y02P 60/40* (2015.11)

(58) Field of Classification Search
CPC .................. G05D 1/02; G05D 1/0293; G05D 2201/0201; A01G 23/02; Y02A 40/243; Y02P 60/40
See application file for complete search history.

(56) References Cited

U.S. PATENT DOCUMENTS

| | | | |
|---|---|---|---|
| 8,359,139 B2* | 1/2013 | Wang | A01B 69/007 701/23 |
| 10,042,361 B2* | 8/2018 | Collins | G01C 21/18 |
| 2003/0187560 A1* | 10/2003 | Keller | A01B 79/005 701/50 |
| 2004/0244660 A1 | 12/2004 | Gabriel | |
| 2008/0269956 A1* | 10/2008 | Dix | A01B 69/008 701/1 |
| 2014/0277965 A1* | 9/2014 | Miller | A01C 7/102 701/50 |
| 2015/0302305 A1* | 10/2015 | Rupp | A01B 79/005 706/46 |
| 2016/0120095 A1 | 5/2016 | Fujimoto et al. | |

FOREIGN PATENT DOCUMENTS

| | | |
|---|---|---|
| JP | 09-294413 A | 11/1997 |
| JP | 2015-139413 A | 8/2015 |
| JP | 2015-188351 A | 11/2015 |

* cited by examiner

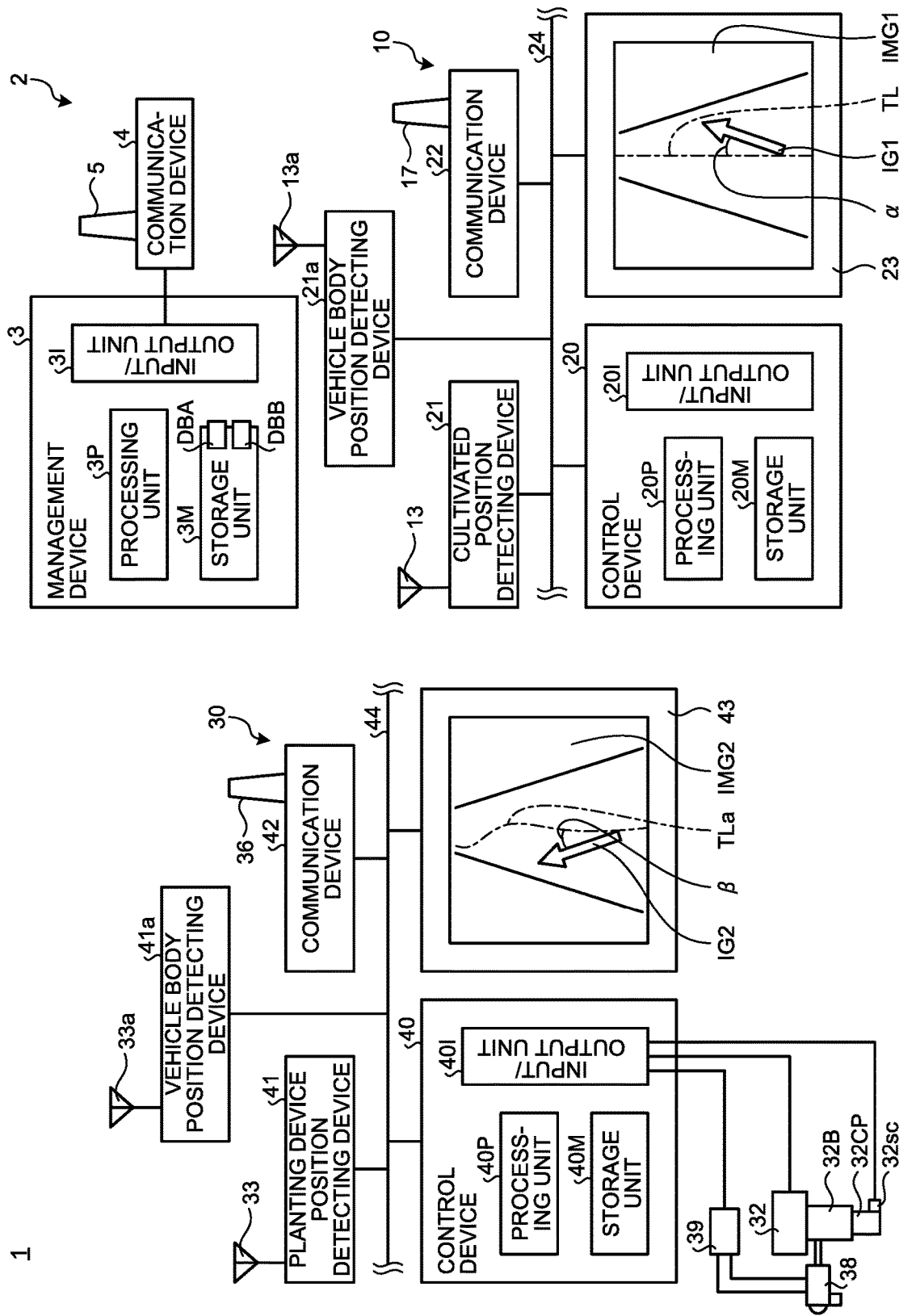

TREE PLANTING SYSTEM, TREE PLANTING METHOD, CULTIVATING MACHINE, TREE PLANTING MACHINE, AND MANAGEMENT DEVICE

FIELD

The present invention relates to a tree planting system to tree planting, a tree planting method, a cultivating machine, a tree planting machine, and a management device.

BACKGROUND

In tree planting, there are kinds of work such as work to form land in a state suitable for tree planting, and work to plant seedlings of trees or seeds of trees in the land formed in the state suitable for tree planting. In recent years, mechanization of tree planting work is proposed because tree planting work is carried out in vast land, for example, in land having a size of several kilometers square to several dozen kilometers square. For example, Patent Literature 1 and Patent Literature 2 disclose a technology in which one vehicle performs both of land cultivation work and plant planting work.

CITATION LIST

Patent Literature

Patent Literature 1: US Patent Application Publication No. 2004/0244660
Patent Literature 2: U.S. Pat. No. 6,164,223

SUMMARY

Technical Problem

A tree planting site is often rough land in which a ground is not flat unlike agricultural land and there are many stumps, tree remnants, rocks, and the like left after logging. Therefore, in a case where one vehicle executes both of work to form soil in a state suitable for planting plants (hereinafter suitably referred to as cultivation work) and work to plant seedlings of plants or seeds of plants in the soil formed in the state suitable for plant planting (hereinafter suitably referred to as planting work) like the technology of Patent Literature 1, there may be problems as follows. In other words, since the land is rough, a vehicle posture at the time of forming the soil in the state suitable for tree planting may be different from a vehicle posture at the time of planting seedlings of trees or seeds of trees, and there may be a case where seedlings of the trees or seeds of the trees cannot be planted in a portion formed in a state suitable for tree planting. As a result, tree planting work may have to be carried out all over again, and efficiency of tree planting work may be degraded.

Additionally, Patent Literature 2 discloses a technology dedicated to tree planting rather than agricultural work, but the technology is a system in which both of cultivation work and planting work are performed by one machine. According to the technology disclosed in Patent Literature 2, cultivation work and planting work are executed in a spot, which is different from Patent Literature 1 in which cultivation work and planting work are executed in a line. Therefore, in a case of adopting the technology disclosed in Patent Literature 2, efficiency is degraded in tree planting work in extremely vast land.

An aspect of the present invention is directed to improving efficiency of tree planting work in promoting mechanization of the tree planting work in vast land.

Solution to Problem

According to a first aspect of the present invention, a tree planting system comprises a first machine, a management device, and a second machine, the first machine including: a cultivating device configured to cultivate soil where a plant for tree planting is to be planted; a first traveling device configured to travel together with the cultivating device; and a cultivated position detecting device configured to obtain and output a plurality of actual cultivated positions which are positions corresponding to positions of the cultivating device while the cultivating device travels together with the first traveling device and cultivates the soil, the management device storing the plurality of actual cultivated positions, the second machine including: a planting device configured to plant the plant in the soil cultivated by the cultivating device; a second traveling device configured to travel together with the planting device; a planting device position detecting device configured to obtain a position of the planting device; and a control device configured to control a position of the planting device on the basis of the plurality of actual cultivated positions acquired from the management device and a position of the planting device obtained by the planting device position detecting device at a timing when the plant is planted.

According to a second aspect of the present invention, in the aspect 1, the control device controls a position of the planting device on the basis of: an actual cultivated line that is a trajectory of the plurality of actual cultivated positions acquired from the management device; and the position of the planting device obtained by the planting device position detecting device at the timing when the plant is planted.

According to a third aspect of the present invention, in the aspect 1 or 2, a detector used for the cultivated position detecting device to obtain the actual cultivated position is attached to the cultivating device.

According to a fourth aspect of the present invention, in any one of the aspects 1 to 3, the planting device position detecting device obtains and outputs an actual planted position that is a position where the plant is planted, and the management device stores the actual planted position obtained by the planting device position detecting device.

According to a fifth aspect of the present invention, in any one of the aspects 1 to 4, a detector used for the planting device position detecting device to detect a position is attached to the planting device.

According to a sixth aspect of the present invention, a tree planting method comprises: obtaining and outputting a plurality of actual cultivated positions which are positions corresponding to positions of a machine that cultivates soil while cultivating the soil in which a plant for tree planting is to be planted; storing the plurality of actual cultivated positions; and acquiring the stored plurality of actual cultivated positions, and controlling a position of a device that plants the plant on the basis of: a cultivated line that is a trajectory of the plurality of actual cultivated positions; and a position of a planting device that plants the plant at a timing when the plant is planted.

According to a seventh aspect of the present invention, the planting method according to the aspect 6, comprises obtaining an actual planted position that is a position where the plant is planted.

According to an eighth aspect of the present invention, a cultivating machine comprises: a cultivating device configured to cultivate soil where a plant for tree planting is to be planted; a traveling device configured to travel together with the cultivating device; and a cultivated position detecting device configured to obtain and output a plurality of actual cultivated positions which are positions corresponding to positions of the cultivating device while the cultivating device travels together with the traveling device and cultivates the soil.

According to a ninth aspect of the present invention, the cultivating machine according to the aspect 8, comprises a display device configured to display a deviation between an advancing direction of the traveling device and a target line provided as a target at a time of planting the plant.

According to a tenth aspect of the present invention, a tree planting machine comprises: a planting device configured to plant a plant for tree planting; a traveling device configured to travel together with the planting device; a planting device position detecting device configured to obtain a position of the planting device; and a control device configured to control a position of the planting device on the basis of: a cultivated line that is a trajectory of a plurality of positions to be reference of planting plants; and a position of the planting device obtained by the planting device position detecting device at a timing when the plant is planted.

According to an eleventh aspect of the present invention, in the aspect 10, a detector used for the planting device position detecting device to obtain a position is attached to the planting device.

According to a twelfth aspect of the present invention, the tree planting machine according to the aspect 10 or 11, comprises a display device configured to display a deviation between an advancing direction of the traveling device and the cultivated line.

According to a thirteenth aspect of the present invention, a management device comprises a storage unit configured to: acquire a plurality of actual cultivated positions which are positions of soil cultivated in order to plant a plant for tree planting; and store an actual cultivated line which is a trajectory of the acquired plurality of actual cultivated positions.

According to a fourteenth aspect of the present invention, in the aspect 13, the storage unit acquires and stores an actual planted position that is a position of the plant planted in the cultivated soil.

Advantageous Effects of Invention

The present invention can improve efficiency of tree planting work in promoting mechanization of the tree planting work in vast land.

BRIEF DESCRIPTION OF DRAWINGS

FIG. 5 is a diagram illustrating a control system of the tree planting system according to the embodiment.

FIG. 8-1 is a front view of a planting device.

FIG. 8-2 is a plan view illustrating a tree planting machine according to a modified example of the embodiment.

FIG. 8-3 is a plan view illustrating a tree planting machine according to a modified example of the embodiment.

FIG. 8-4 is a plan view illustrating a tree planting machine according to a modified example of the embodiment.

FIG. 8-5 is a plan view illustrating a tree planting machine according to a modified example of the embodiment.

FIG. 8-6 is a plan view illustrating a tree planting machine according to a modified example of the embodiment.

DESCRIPTION OF EMBODIMENTS

A mode (embodiment) to implement the present invention will be described in detail with reference to the drawings.

<Tree Planting Plan>

Figure 1:
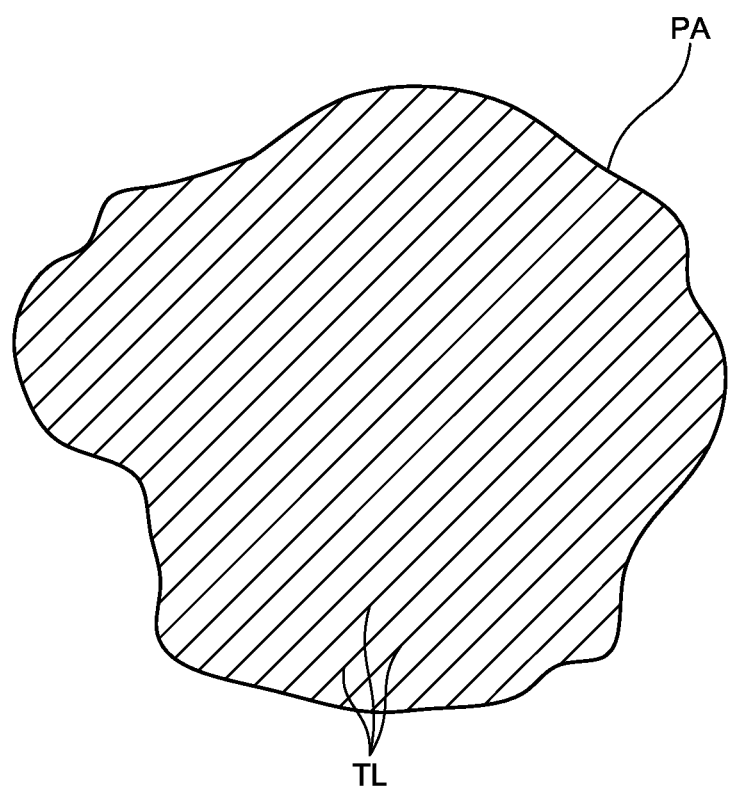
FIG. 1 is a diagram illustrating a tree planting plan in a tree planting area where a tree planting system is applied as an embodiment.

FIG. 1 is a diagram illustrating a tree planting plan in a tree planting area PA where a tree planting system is applied as an embodiment. As illustrated in FIG. 1, in a tree planting planning stage, a plurality of tree planting target lines TL extending in parallel to each other is set in the tree planting area PA. An interval between adjacent tree planting target lines TL is, for example, about three to five meters, but not limited thereto. A length of the tree planting target line TL may be a length from several hundred meters to several kilometers, but needless to mention, not limited thereto. The planned tree planting target lines TL are preliminarily stored in a storage unit 3M of a management device 3 and a storage unit 20M of a cultivating machine 10, and also are stored in a storage unit 40M of a tree planting machine 30.

<Overview of Tree Planting System 1>

Figure 2:
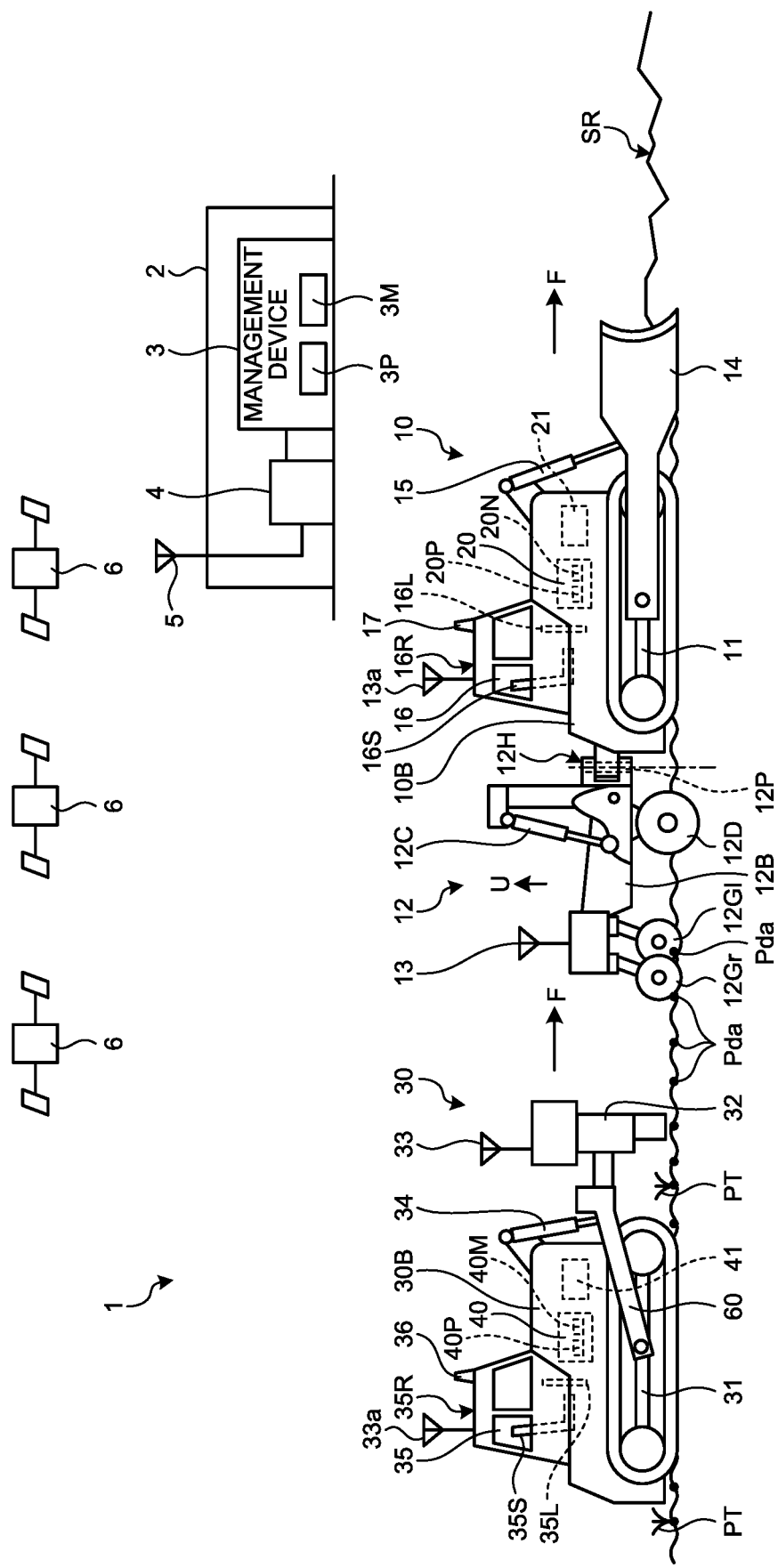
FIG. 2 is a view illustrating a tree planting system according to the embodiment.
Figure 3:
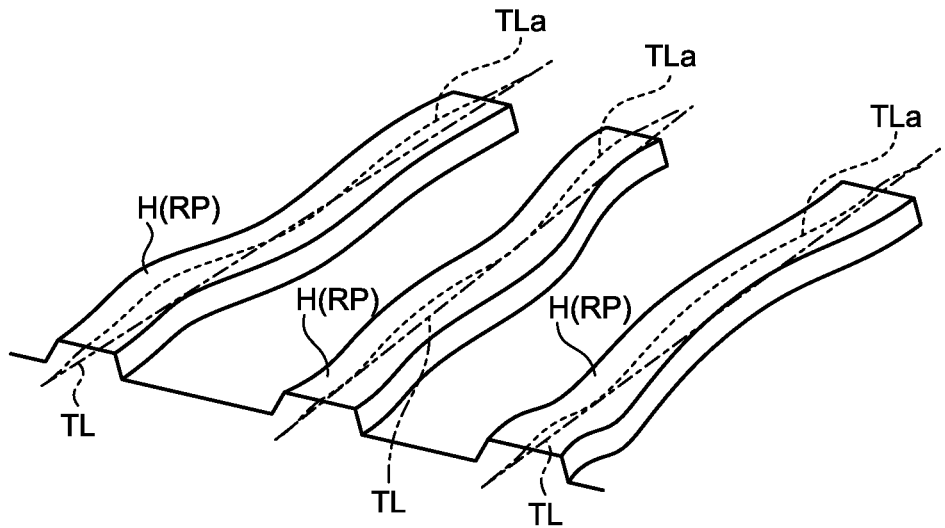
FIG. 3 is a view illustrating an exemplary cultivated soil formed by a cultivating machine.
Figure 4:
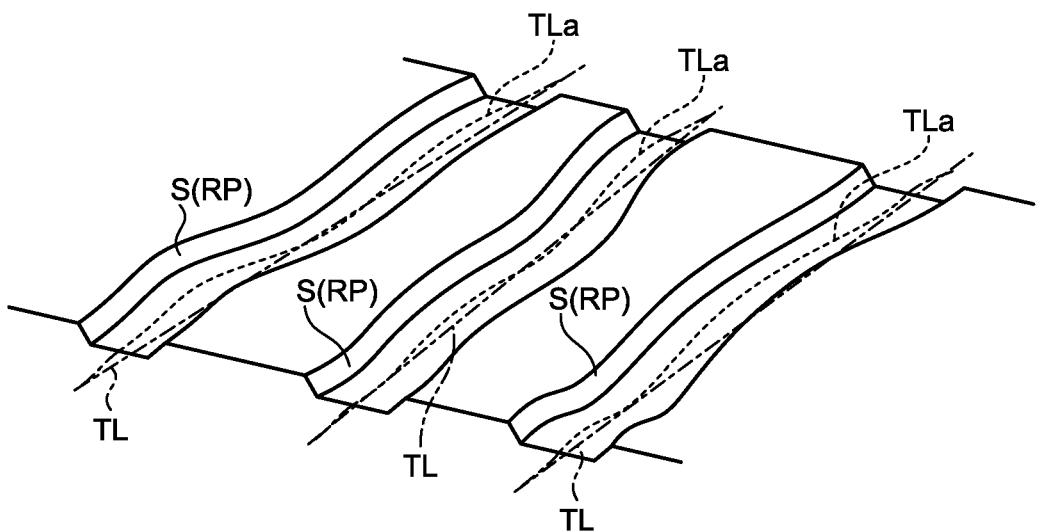
FIG. 4 is a view illustrating an exemplary cultivated soil formed by the cultivating machine.
Figure 6:
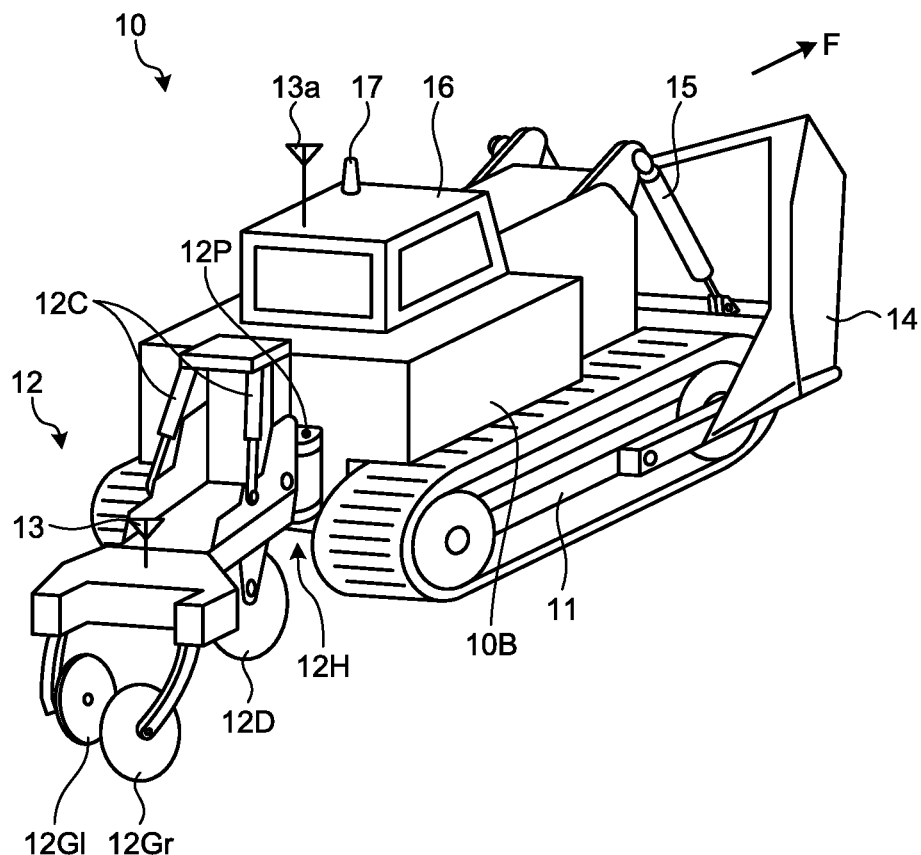
FIG. 6 is a perspective view of a cultivating machine according to the embodiment.
Figure 7:
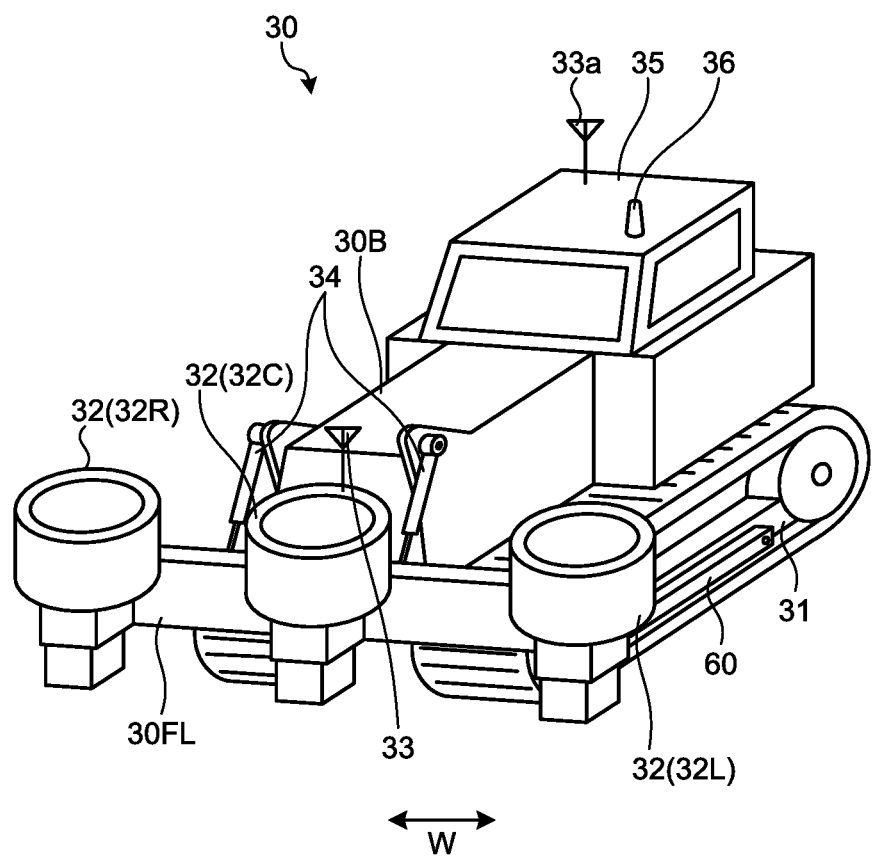
FIG. 7 is a perspective view of the tree planting machine according to the embodiment.

FIG. 2 is a view illustrating a tree planting system 1 according to an embodiment. FIGS. 3 and 4 are views illustrating exemplary cultivated soil RP formed by the cultivating machine 10. FIG. 5 is a diagram illustrating a control system of the tree planting system 1 according to the embodiment. FIG. 6 is a perspective view of the cultivating machine 10 according to the embodiment. FIG. 7 is a perspective view of the tree planting machine 30 according to the embodiment. The tree planting system 1 includes the cultivating machine 10 provided as a first machine, the management device 3 having the storage unit 3M, and the tree planting machine 30 provided as a second machine. The tree planting system 1 uses, as a target, an actual cultivated position Pda indicating a position in the cultivated soil RP when the tree planting machine 30 plants a plant PT for tree planting, and here the cultivated soil RP is the soil that has been cultivated by the cultivating machine 10 in order to plant the plant PT. The plant PT for tree planting includes seedlings seeds of trees and seeds of trees used for tree planting.

<Cultivating Machine 10>

The cultivating machine 10 is a machine to cultivate, along tree planting target lines TL illustrated in FIG. 1, uncultivated soil SR that has not been cultivated for tree planting. The cultivating machine 10 has a first traveling device 11, a cultivating device 12, and a position detecting device 21 illustrated in FIG. 5 and serving as a tree planting target position detecting device. The first traveling device 11 makes the cultivating machine 10 travel. In the embodiment, the first traveling device 11 is a device that travels by transmitting, to a crawler belt, power of an internal combustion engine, an electric motor, or the like serving as a power source, but not limited to such a device. The first traveling device 11 may also be a device that travels while transmitting power of a power source to wheels.

In the cultivating machine 10, a direction from an operator's seat 16S to an operating device 16L in an operating room 16 is front or a frontward direction, and a direction from the operating device 16L to the operator's seat 16S is rear or a rearward direction. The right and left of the cultivating machine 10 are set on the basis of the front. A width direction of the cultivating machine 10 is a direction orthogonal to a direction from the operator's seat 16S to the operating device 16L.

The cultivating machine 10 has a blade 14 on the front side in an advancing direction F. The cultivating machine 10 has a cultivating device 12 on the rear side in the advancing direction F. The blade 14 is a device to remove stumps, tree remnants, rocks, and the like remaining after logging in the uncultivated soil SR that has not been cultivated for tree planting. The cultivating device 12 is a device to cultivate the uncultivated soil SR and form the cultivated soil RP that is the soil cultivated to plant a plant PT. The cultivating machine 10 removes, with the blade 14, stumps and the like remaining in the uncultivated soil SR after logging while traveling in the advancing direction F along the tree planting target lines TL illustrated in FIG. 1, and forms the cultivated soil RP by the cultivating device 12.

As illustrated in FIGS. 2 and 6, the cultivating device 12 has a main body 12B, a crushing disc 12D, cultivation discs 12Gl, 12Gr, and a hydraulic cylinder 12C. The crushing disc 12D, cultivation discs 12Gl, 12Gr, and hydraulic cylinder 12C are attached to the main body 12B. The crushing disc 12D is arranged in front of the cultivating machine 10, and the cultivation discs 12Gl, 12Gr are arranged in rear of the cultivating machine 10. When the cultivating device 12 is moved, the crushing disc 12D is rotated and simultaneously crushes stumps and the like remaining in the uncultivated soil SR after logging.

When the cultivating device 12 is moved, the cultivation discs 12Gl, 12Gr are rotated and simultaneously cultivate the uncultivated soil SR where the crushing disc 12D has passed, thereby forming cultivated soil RP. In this embodiment, the cultivating device 12 has two cultivation discs 12Gl, 12Gr, but the number of the cultivation discs 12Gl, 12Gr is not limited to two. The hydraulic cylinder 12C presses the main body 12B against the uncultivated soil SR. In this embodiment, as illustrated in FIG. 6, the cultivating device 12 has a pair of hydraulic cylinders 12C, 12C, but the number of the hydraulic cylinders 12C is not limited.

As illustrated in FIG. 3, the cultivating device 12 forms, as the cultivated soil RP, a ridge H extending in a line along a tree planting target line TL, for example. Additionally, as illustrated in FIG. 4, the cultivating device 12 forms, as the cultivated soil RP, a furrow S extending in a line along a tree planting target line TL, for example. The cultivated soil RP is not limited to the ridge H or the furrows S.

The cultivating device 12, more specifically, the main body 12B of the cultivating device 12 is attached to a vehicle body 10B via a coupling mechanism 12H. The coupling mechanism 12H couples the cultivating device 12 to the vehicle body 10B by pin coupling using a pin 12P extending along an axis Zp (refer to FIGS. 2 and 6). With this structure, the cultivating device 12 is rotated around the axis Zp, and therefore, the cultivating device 12 can be rotated rightward and leftward with respect to the vehicle body 10B. Additionally, a position of the cultivating device 12 in a height direction U is adjusted by the hydraulic cylinders 12C.

In the embodiment, since the cultivating device 12 can be rotated rightward and leftward with respect to the vehicle body 10B of the cultivating machine 10, the cultivating device 12 can follow a shape of the uncultivated soil SR where the cultivated soil RP is to be formed from now on. A target place of tree planting is often rugged land where there are tree stumps, rocks, and the like remaining after logging. Therefore, since the cultivating device 12 has a structure that can be rotated rightward and leftward with respect to the vehicle body 10B, malfunction of the cultivating device 12 caused by remaining stumps, rocks, and the like is suppressed.

As illustrated in FIG. 5, the cultivating machine 10 further includes a control device 20, a cultivated position detecting antenna 13, the cultivated position detecting device 21, a vehicle body position detecting antenna 13a, and a vehicle body position detecting device 21a. The cultivated position detecting device 21 is a device to obtain, by using the cultivated position detecting antenna 13, an actual cultivated position Pda corresponding to a position of the cultivating device 12, and output the actual cultivated position Pda. While the cultivating device 12 travels together with the first traveling device 11 to cultivate soil, specifically, uncultivated soil SR, the cultivated position detecting device 21 obtains and outputs a plurality of actual cultivated positions Pda. The actual cultivated position Pda is a position of the uncultivated soil SR cultivated by the cultivating device 12 and is a reference position to plant a plant PT. The actual cultivated position Pda output from the tree planting target position detecting device is transmitted to the management device 3 and stored in the storage unit 3M of the management device 3.

A trajectory of the actual cultivated positions Pda acquired along with movement of the cultivating machine 10 is formed like a line. In a case where the cultivating machine 10 is moved along a tree planting target line TL, the trajectory of the actual cultivated positions Pda is also formed along the tree planting target line TL. In the following, the trajectory of the actual cultivated positions Pda formed like a line will be referred to as an actual cultivated line TLa. In the storage unit 3M of the management device 3, an actual cultivated position Pda or an actual cultivated line TLa that is the trajectory of the actual cultivated positions Pda is stored.

In the embodiment, the cultivating machine 10 further includes a hydraulic cylinder 15 that functions to vertically move the blade 14, the operating room 16, and a communication antenna 17. The blade 14 is arranged on a front side in the advancing direction F of the cultivating machine 10. As illustrated in FIG. 6, the blade 14 has a shape in which a center portion in a width direction has a shape sharpened toward the advancing direction F side of the cultivating machine 10, but the blade 14 is not limited thereto. Additionally, the cultivating machine 10 is only required to have at least the cultivating device 12 and may not necessarily have the blade 14 like this embodiment.

The hydraulic cylinder 15 is an actuator to vertically move the blade 14. The operating room 16 is arranged on an upper side of the traveling device 11, specifically, on a side distant from a ground contact surface of the traveling device 11. The operating room 16 is a room for an operator of the cultivating machine 10 to board and operate the cultivating machine 10. In other words, the cultivating machine 10 is a manned vehicle in the embodiment. The communication antenna 17 is used when the cultivating machine 10 communicates with the management device 3 installed inside a management facility 2. In the embodiment, the communication antenna 17 is attached to a roof 16R of the operating room 16, but a place where the communication antenna 17 is to be attached is not limited to the roof 16R.

The cultivated position detecting antenna 13 is a detector used for the cultivated position detecting device 21 to obtain an actual cultivated position Pda of soil cultivated by the cultivating device 12. In the embodiment, the cultivated position detecting device 21 obtains an actual cultivated position Pda of soil cultivated by the cultivating device 12 by utilizing, for example, real time kinematic-global navigation satellite systems (RTK-GNSS: GNSS represents a global navigation satellite system). The cultivated position detecting device 21 acquires a signal corresponding to a GNSS radio wave received from a positioning satellite 6 by the cultivated position detecting antenna 13. Then, the cultivated position detecting device 21 obtains an actual cultivated position Pda on the basis of the signal corresponding to the received GNSS radio wave.

In the embodiment, the cultivated position detecting antenna 13 is attached to the cultivating device 12. With this structure, the cultivated position detecting antenna 13 is moved together with the cultivating device 12 even in a case where a posture of the cultivating device 12 is changed with respect to the vehicle body 10B of the cultivating machine 10, and therefore, the cultivated position detecting device 21 can correctly obtain an actual cultivated position Pda. In the embodiment, the cultivated position detecting antenna 13 is arranged in a center between the pair of cultivating discs 12Gl, 12Gr in the width direction and in a front-rear direction of the cultivating device 12. With this arrangement, an actual cultivated position Pda obtained by the cultivated position detecting device 21 can be made to coincide with a position where the pair of cultivating discs 12Gl, 12Gr has cultivated.

In the embodiment, the width direction of the cultivating device 12 is a direction parallel to an axis serving as a rotation center of the crushing disc 12D, and the front-rear direction of the cultivating device 12 is a direction orthogonal to the width direction of the cultivating device 12. The cultivated position detecting antenna 13 is not limited to the one described above. For example, the cultivated position detecting antenna 13 may be arranged at a position distant from the cultivation discs 12Gl, 12Gr. Furthermore, the cultivated position detecting device 21 may obtain positions of the cultivation discs 12Gl, 12Gr from the position of the cultivated position detecting antenna 13 on the basis of a relative positional relation between the cultivated position detecting antenna 13 and the cultivation discs 12Gl, 12Gr, and may set the obtained positions as actual cultivated positions Pda.

The vehicle body position detecting antenna 13a is a detector used for the vehicle body position detecting device 21a to obtain a position of the vehicle body 10B of the cultivating machine 10. The vehicle body position detecting antenna 13a is provided at the vehicle body 10B. Since a method of obtaining a position of the vehicle body 10B by the vehicle body position detecting antenna 13a is similar to the method of obtaining an actual cultivated position Pda by the cultivated position detecting antenna 13, a detailed description thereof will be omitted. In the embodiment, the number of the cultivated position detecting antennas 13 and the number of the vehicle body position detecting antennas 13a are not limited to one, and may be two or more.

Both of the cultivated position detecting antenna 13 and the vehicle body position detecting antenna 13a are not necessarily required. As far as a relative positional relation between a cultivated position cultivated by the cultivating device 12 and the vehicle body 10B can be detected, any one of the cultivated position detecting antenna 13 and the vehicle body position detecting antenna 13a may be omitted. Then, the control device 20 may obtain an actual cultivated position Pda or a position of the vehicle body 10B by performing calculation on the basis of positional information obtained by the other one thereof. In this case, a position detecting device corresponding to the omitted position detecting antenna can also be omitted. In the embodiment, an actual cultivated position Pda and a position of the vehicle body 10B are indicated by, for example, two-dimensional coordinates represented by a global coordinate system, but these positions may also be indicated by three-dimensional coordinates.

<Management Device 3>

The management device 3 is installed inside the management facility 2. The management device 3 is connected to a communication device 4. The management device 3 communicates with the cultivating machine 10 and the tree planting machine 30 via an antenna 5 of the communication device 4. The management device 3 stores, in the storage device, at least one of an actual cultivated position Pda and an actual cultivated line TLa acquired from the cultivating machine 10 via the communication device 4, and further transmits, to the tree planting machine 30, at least one of the actual cultivated position Pda and the actual cultivated line TLa stored in the storage device in response to a request from the tree planting machine 30. In the embodiment, communication between the management device 3, cultivating machine 10, and tree planting machine 30 is radio communication. Information exchange in the tree planting system 1 is not necessarily radio communication. Information exchange in the tree planting system 1 may also be by wired communication or by using a recording medium such as a universal serial bus (USB) memory. The communication device 4 and the antenna 5 in the embodiment, or a driver and the like of a storage medium correspond to an acquisition unit and a transmitting unit in the embodiment.

<Tree Planting Machine 30>

The tree planting machine 30 is a machine that is operated to travel along a plurality of actual cultivated positions Pda or an actual cultivated line TLa, and executes planting work along the plurality of actual cultivated positions Pda or actual cultivated line TLa. The tree planting machine 30 has a planting device 32, a second traveling device 31, a position detecting device 41 serving as a planting device position detecting device, and a control device 40. The second traveling device 31 makes the tree planting machine 30 travel. In the embodiment, the second traveling device 31 is a device that travels by transmitting, to the crawler, power of an internal combustion engine, an electric motor, or the like serving as a power source, but not limited to such a device. The second traveling device 31 may be a device that travels by transmitting power of the power source to wheels.

In the tree planting machine 30, a direction from an operator's seat 35S to an operating device 35L in an operating room 35 is front or a frontward direction, and a direction from the operating device 35L to the operator's seat 35S is rear or a rearward direction. The right and left of the cultivating machine 10 are set on the basis of the front. A width direction of the tree planting machine 30 is a direction orthogonal to a direction from the operator's seat 35S to the operating device 35L.

The planting device 32 plants a plant PT in cultivated soil RP. More specifically, the tree planting machine 30 is operated to travel along an actual cultivated line TLa, and the planting device 32 plants a plant PT at a predetermined interval along the actual cultivated line TLa. Since the actual cultivated line TLa is a part actually cultivated by the cultivating device 12 of the cultivating machine 10, a deviation between the planting device 32 and the actual cultivated line TLa can be minimized by operating the tree planting machine 30 to travel along the actual cultivated line TLa. Meanwhile, the tree planting machine 30 may also be operated to travel along a tree planting target line TL.

The planting device 32 is attached to the second traveling device 31 of the tree planting machine 30 via an arm 60. The planting device 32 is arranged on the front side in an advancing direction F of the tree planting machine 30. The planting device 32 may also be arranged on the rear side in the advancing direction F of the tree planting machine 30. As illustrated in FIGS. 2, 5, and 6, the tree planting machine 30 further includes a planting device position detecting antenna 33, a vehicle body position detecting antenna 33a, and a vehicle body position detecting device 41a.

The planting device position detecting device 41 is a device to obtain a position of the planting device 32 by using the planting device position detecting antenna 33, and output the same. The control device 40 acquires an actual cultivated line TLa from the management device 3 via the communication device 4 and a communication device 42 of the tree planting machine 30. The control device 40 controls a position or a posture of the planting device 32 on the basis of the acquired actual cultivated line TLa and a current position of the planting device 32 obtained by the planting device position detecting device 41. The current position of the planting device 32 is a position of the planting device 32 obtained by the planting device position detecting device 41 at the timing when a plant PT is planted. The timing when the plant PT is planted is the timing from when the tree planting machine 30 is stopped to plant the plant PT in cultivated soil RP until just before the planting device 32 plants the plant PT in the cultivated soil RP.

In the embodiment, the tree planting machine 30 also has a hydraulic cylinder 34, an operating room 35, and a communication antenna 36. The hydraulic cylinder 34 is an actuator to vertically move the planting device 32. The operating room 35 is arranged on an upper side of the second traveling device 31, specifically, on a side distant from a ground contact surface of the second traveling device 31. The operating room 35 is a room for an operator of the tree planting machine 30 to board and operate the tree planting machine 30. In other words, the tree planting machine 30 is a manned vehicle in the embodiment. The communication antenna 36 is used when the control device 40 of the tree planting machine 30 communicates with the management device 3 installed inside the management facility 2. In the embodiment, the communication antenna 36 is attached to a roof 35R of the operating room 35, but the place where the communication antenna 36 is attached is not limited to the roof 35R.

The planting device position detecting antenna 33 is a detector used for the planting device position detecting device 41 to obtain a position of the planting device 32. In the embodiment, the planting device position detecting device 41 is attached to the planting device 32. The planting device position detecting device 41 obtains the position of the planting device 32 by using, for example, an RTK-GNSS. Since a method of obtaining a position of the planting device 32 by the planting device position detecting antenna 33 is similar to the method of obtaining an actual cultivated position Pda by the cultivated position detecting antenna 13 of the cultivating machine 10, a detailed description thereof will be omitted.

In the embodiment, the planting device position detecting antenna 33 is attached to the planting device 32. With this structure, the planting device position detecting antenna 33 is moved together with the planting device 32 even in a case where a posture of the planting device 32 is changed with respect to the vehicle body 30B of the tree planting machine 30, and therefore, the planting device position detecting device 41 can correctly obtain a position of the planting device 32. As illustrated in FIG. 7, the planting device position detecting antenna 33 is attached to a planting device 32C out of three planting devices 32 arrayed side by side in the width direction W of the tree planting machine 30, and the planting device 32C is located at a center in a width direction W.

The vehicle body position detecting antenna 33a is a detector used for the vehicle body position detecting device 41a to obtain a position of the vehicle body 30B of the tree planting machine 30. The vehicle body position detecting antenna 33a is provided at the vehicle body 30B. Since a method of obtaining a position of the vehicle body 10B by the vehicle body position detecting antenna 13a is similar to a method of obtaining an actual cultivated position Pda by the cultivated position detecting antenna 13, a detailed description thereof will be omitted. The number of the planting device position detecting antennas 33 and the number of the vehicle body position detecting antennas 33a are not limited to one and may be two or more.

Both of the planting device position detecting antenna 33 and the vehicle body position detecting antenna 33a are not necessarily required. As far as a relative positional relation between a position of the planting device 32 and the vehicle body 30B can be detected, any one of the planting device position detecting antenna 33 and the vehicle body position detecting antenna 33a may be omitted. Then, the control device 40 may also obtain a position of the planting device 32 or a position of the vehicle body 30B by performing calculation on the basis of positional information obtained by the other one thereof. In this case, a position detecting device corresponding to the position detecting antenna on the omitted side can also be omitted. In the embodiment, the position of the planting device 32 obtained by the planting device position detecting device 41 and the position of the vehicle body 30B obtained by the vehicle body position detecting device 41a are indicated by, for example, two-dimensional information represented by a global coordinate system, but may also be indicated by three-dimensional information.

Figures 1, 8:
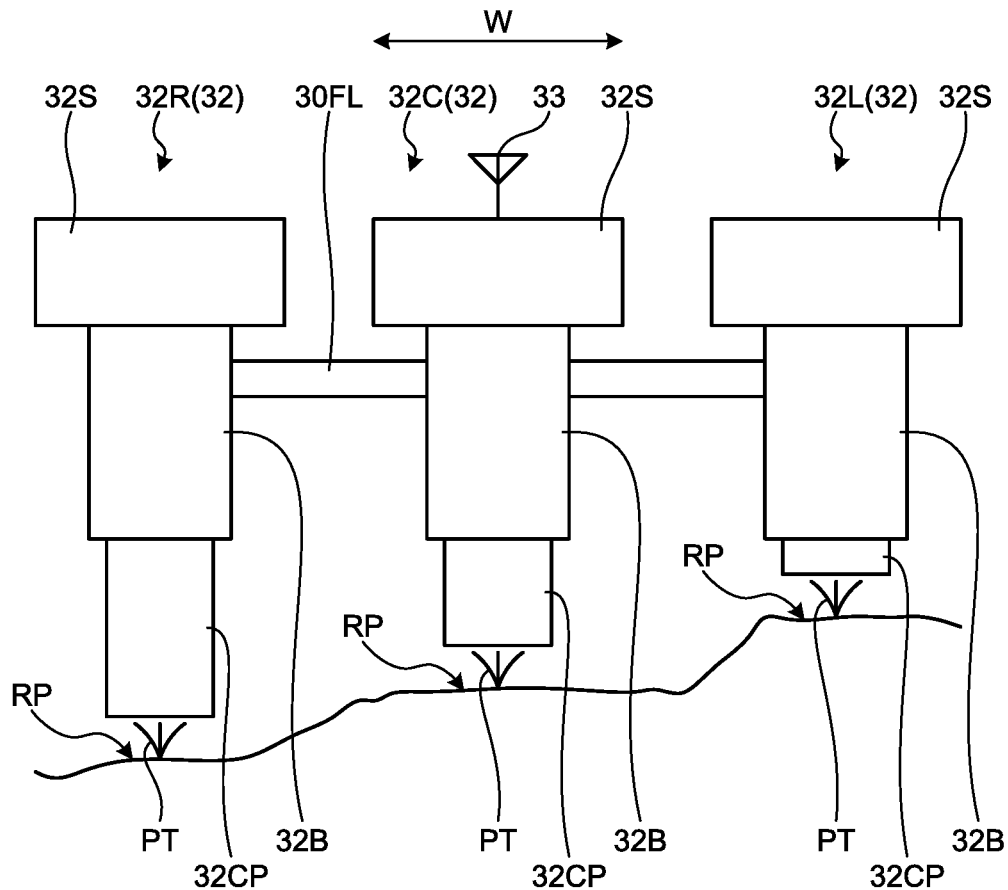
Figures 2, 8:
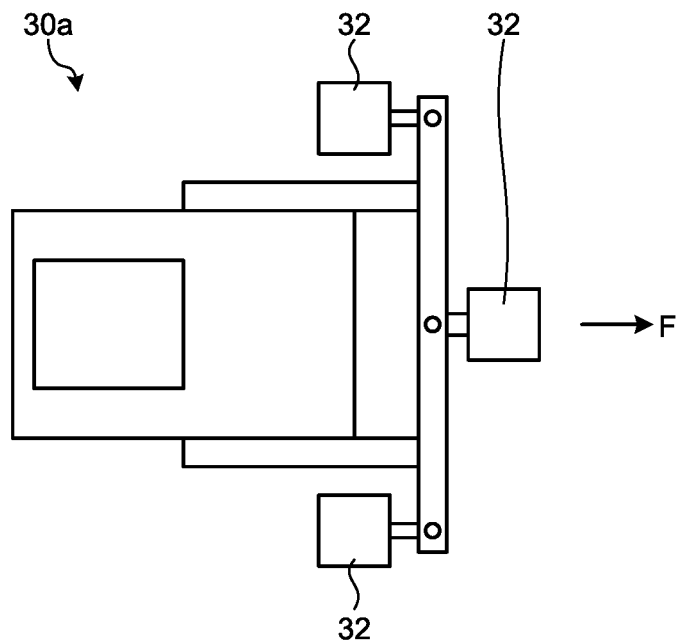
Figures 3, 8:
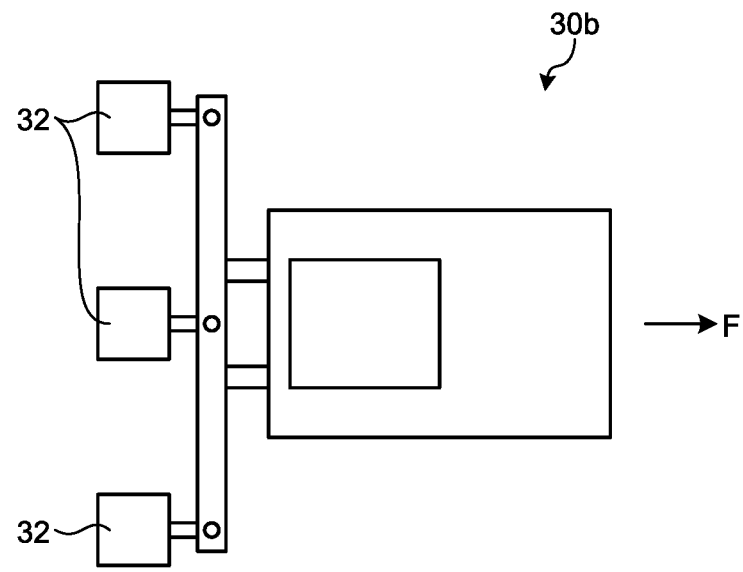
Figures 4, 8:
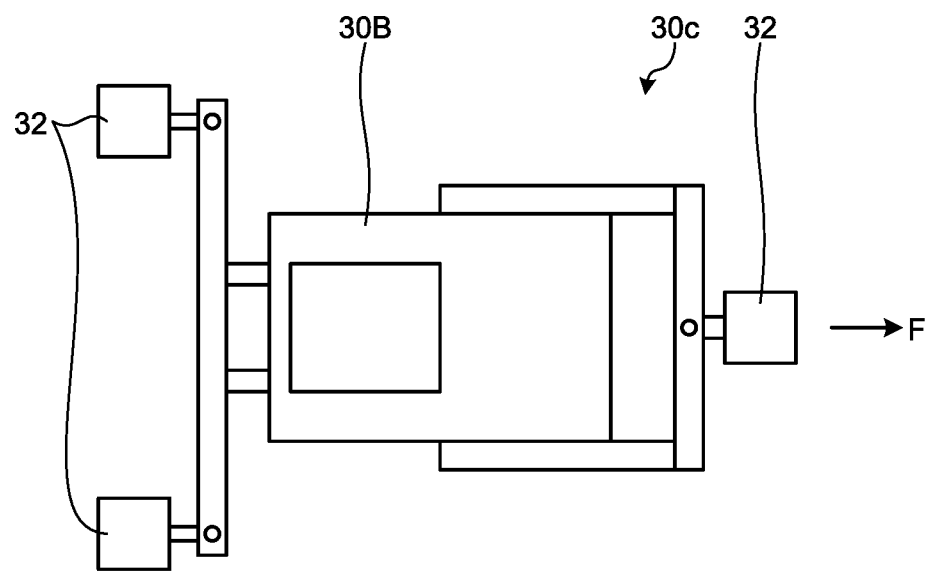
Figures 5, 8:
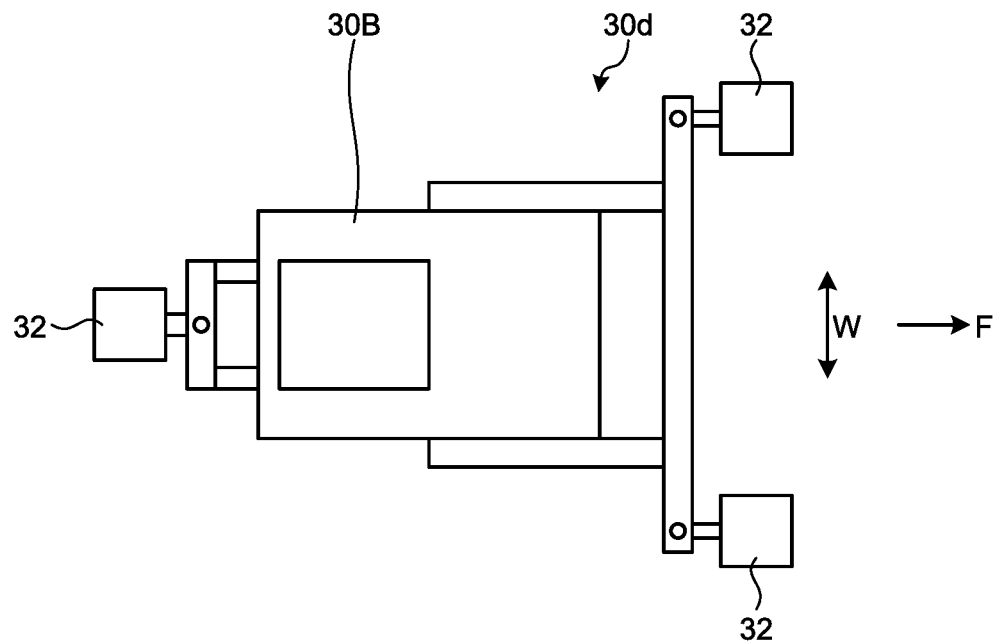
Figures 6, 8:
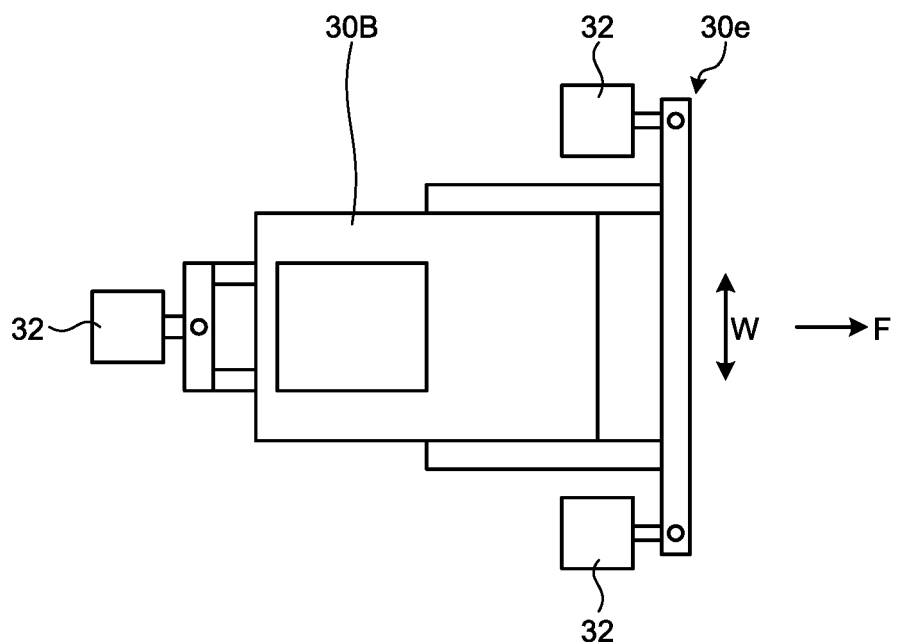
Figure 9:
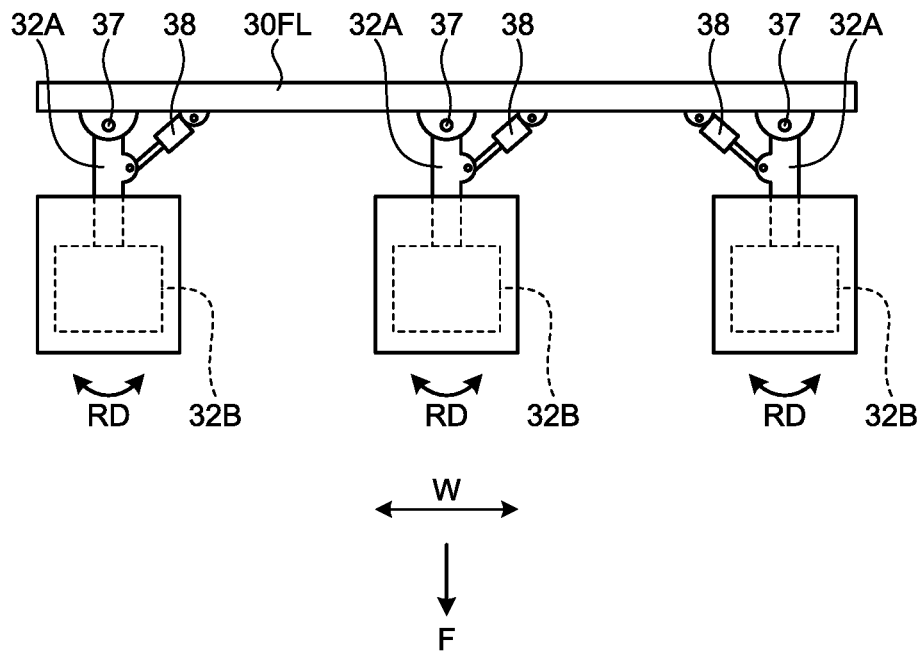
FIG. 9 is a plan view of the planting device.

FIG. 8-1 is a front view of the planting device 32. FIG. 9 is a plan view of the planting device 32. In the embodiment, the tree planting machine 30 has the three planting devices 32. The three planting devices 32 are arranged side by side in the width direction W of the planting device 32. The width direction W of the tree planting machine 30 is a direction orthogonal to a direction from the operating room 35 of the tree planting machine 30 to the planting device 32. As for the three planting devices 32, note that the one located on the left with respect to the advancement direction of the tree planting machine 30, specifically, a direction from the operator's seat 35S to the operating device 35L will be referred to as a planting device 32L, the one located on the right will be referred to as a planting device 32R, and the one located between the planting device 32L and the planting device 32R will be referred to as the planting device 32C. In a case where there is no need to differentiate one from the other thereof, each one will be referred to as the planting device 32. The number of the planting devices 32 is not limited to three and may also be one, two, four or more.

FIGS. 8-2 to 8-6 are plan views respectively illustrating the tree planting machines 30a, 30b, 30c, 30d, and 30e according to modified examples of the embodiment. The tree planting machine 30a illustrated in FIG. 8-2 is similar to the tree planting machine 30 in that a plurality of planting devices 32 is provided on the front side in the advancing direction F, but is different in that one planting device 32 is faces the front in the advancing direction F and the remaining planting devices 32 face the rear the advancing direction F. The tree planting machine 30b illustrated in FIG. 8-3 has a plurality of planting devices 32 on a rear side in the advancing direction F.

The tree planting machines 30c, 30d, and 30e illustrated in FIGS. 8-4, 8-5, and 8-6 each have planting devices 32 on both of the front side and the rear side in the advancing direction F. The tree planting machine 30c has one planting device 32 on the front side in the advancing direction F and two planting devices 32 on the rear side in the advancing direction F. The planting device 32 included in the tree planting machine 30c and located on the front side in the advancing direction F faces the front in the advancing direction F, and the planting devices 32 located on the rear side in the advancing direction F face the rear in the advancing direction F.

In the tree planting machine 30c, since the planting devices 32 are arranged in both of the front and rear sides of the vehicle body 30B, balance between the front and the rear is improved. States of the two planting devices 32 arranged on the rear side in the advancing direction F are visually checked by a rearview mirror of the tree planting machine 30c. The tree planting machine 30c can plant plants PT only in one row by using the one planting device 32 arranged in the front in the advancing direction F. The tree planting machine 30c does not require a tilting mechanism for the one planting device 32 arranged in the front in the advancing direction F, weight reduction can be achieved.

The tree planting machines 30d, 30e each have two planting devices 32 on the front side in the advancing direction F and one planting device 32 on the rear side in the advancing direction F. The planting devices 32 on the front side in the advancing direction F of the tree planting machine 30d face the front in the advancing direction F, and the planting device 32 on the rear side in the advancing direction F faces the rear in the advancing direction F. The planting devices 32 on the front side in the advancing direction F of the tree planting machine 30e face the rear in the advancing direction F, and the planting device 32 on the rear side in the advancing direction F faces the rear in the advancing direction F.

In the tree planting machines 30d, 30e, the planting devices 32 are arranged in both of the front and back of the vehicle body 30B, balance in the front and the rear is improved. In a case of a bulldozer is utilized as each of the tree planting machines 30d, 30e, the two planting devices 32 arranged on the front side in the advancing direction F are supported at a wide position in the width direction W by utilizing blade linkage, and therefore, stability is improved. One planting device 32 arranged on the rear side in the advancing direction F is attached to the vehicle body 30B by utilizing a link of a ripper of the bulldozer.

The tree planting machines 30d, 30e each can plant plants PT only in one row by using the one planting device 32 arranged in the rear in the advancing direction F. The one planting device 32 arranged in the rear in the advancing direction F is arranged at the center in the width direction W in each of the tree planting machines 30d, 30e, but plants PT can be planted with relatively high accuracy by using a guidance screen described later, and therefore, the planting device 32 is arranged in the rear of each of the tree planting machines 30d, 30e. Preferably, a planting device 32 that may cause a problem of having relatively low planting accuracy and is arranged at the center in the width direction W of each of the tree planting machines 30d, 30e is arranged in the front of each of the tree planting machines 30d, 30e because an operator can directly visually check operation thereof.

The planting device 32 has a plant holding portion 32S, a main body portion 32B, and an extendable portion 32CP. The main body portion 32B is attached to a frame 30FL. The frame 30FL is attached to the arm 60 illustrated in FIG. 2 and supported by the arm 60. The plant holding portion 32S is attached to a first end portion of the main body portion 32B. The extendable portion 32CP projects from a second end portion of the main body portion 32B.

The plant holding portion 32S holds a plant PT to be planted in cultivated soil RP. The main body portion 32B picks out a plant PT from the plant holding portion 32S and plants the same in the cultivated soil RP from a tip of the extendable portion 32CP, specifically, an end portion of the extendable portion 32CP projecting from the main body portion 32B. A length of the extendable portion 32CP projecting from the main body portion 32B is changed by a hydraulic cylinder or the like, for example. With this structure, even in a case where a distance from the main body portion 32B to the cultivated soil RP is changed, the planting device 32 can plant a plant PT in the cultivated soil RP by extending/contracting the extendable portion 32CP.

In the embodiment, the planting device position detecting antenna 33 is attached to the planting device 32C out of the three planting devices 32L, 32C, and 32R. The positions of the planting devices 32L, 32R to which the planting device position detecting antenna 33 is not attached are obtained from relative positional relation between the planting device position detecting antenna 33 and the planting devices 32L and 32R. In the embodiment, the planting device position detecting antenna 33 may also be attached to each of the three planting devices 32L, 32C, and 32R. With this structure, position accuracy of the three planting devices 32L, 32C, and 32R is improved. In a case where the tree planting machine 30 has a plurality of planting device position detecting antennas 33, the planting device position detecting devices 41 are also required as many as the planting device position detecting antennas 33.

As illustrated in FIG. 9, the planting device 32 is coupled to the frame 30FL via a coupling member 32A and a pin 37. A direction in which the pin 37 extends in a direction parallel to an extending/contracting direction of the extendable portion 32CP of the planting device 32. With this structure, the planting device 32 is rotated around the pin 37 in a direction indicated by an arrow RD in FIG. 9. With this operation, the position the planting device 32 in the width direction W of the tree planting machine 30 is changed.

A hydraulic cylinder 38 that is a planting device driving device is arranged between the coupling member 32A and the frame 30FL. The hydraulic cylinder 38 is an actuator that changes a position of the planting device 32 in the width direction W of the tree planting machine 30 by rotating the planting device 32 around the pin 37. Operation of the hydraulic cylinder 38 is controlled by the control device 40 of the tree planting machine 30.

The structure in which the planting device 32 is moved in the width direction W of the tree planting machine 30 is not limited to coupling by the pin 37. For example, the planting device 32 may be attached to the frame 30FL via a slider mechanism slidable in the width direction W of the tree planting machine 30. With this structure, the position of the planting device 32 in the width direction W of the tree planting machine 30 is changed.

<Planting Device 32a according to Modified Example>

Figure 10:
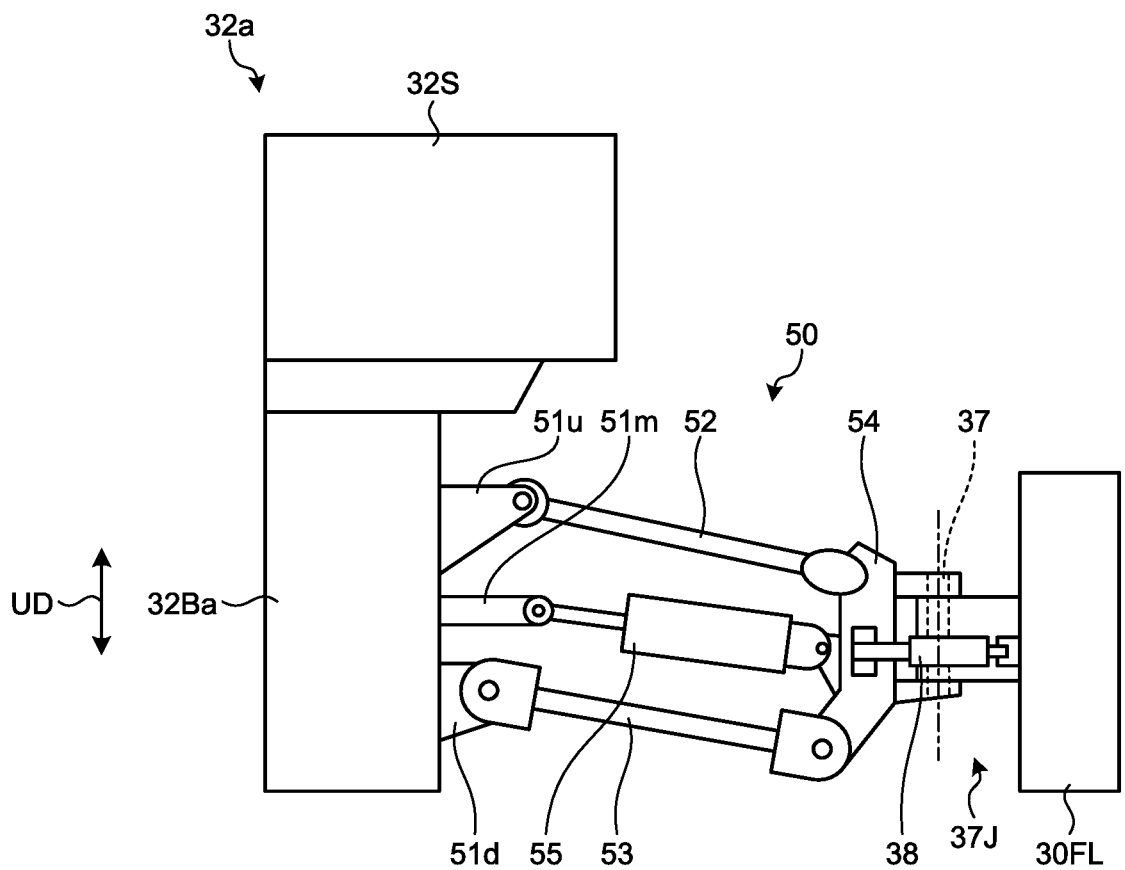
FIG. 10 is a view to describe a lifting mechanism of the planting device according to a modified example of the embodiment.

FIG. 10 is a view to describe a lifting mechanism 50 of a planting device 32a according to a modified example of the embodiment. The planting device 32a is attached to the frame 30FL via the lifting mechanism 50. The lifting mechanism 50 is attached to brackets 51u, 51d, and 51m provided on a main body portion 32Ba of the planting device 32a. The lifting mechanism 50 includes a first arm 52, a second arm 53, a support 54, and a hydraulic cylinder 55 serving as an actuator.

The first arm 52 couples the support body 54 to the bracket 51u, and the second arm 53 couples the support body 54 to the bracket 51d. The first arm 52, support body 54, and bracket 51u are pin-coupled. Additionally, the second arm 53, support body 54, and bracket 51d are pin-coupled. With this structure, the planting device 32a is rotated with respect to the support body 54. The hydraulic cylinder 55 is attached between the support body 54 and the bracket 51m. The planting device 32a is moved up and down by extending/contracting the hydraulic cylinder 55 (movement in a direction indicated by an arrow UD in FIG. 10).

The support body 54 is pin-coupled to the frame 30FL via a pin 37 of a coupling mechanism 37J. A hydraulic cylinder 38 is arranged between the support body 54 and the frame 30FL. Since the planting device 32a is rotated around the pin 37 by extending/contracting the hydraulic cylinder 38, a position of the planting device 32a in the width direction W of the tree planting machine 30 is changed.

<Control System of Tree Planting System 1>

Next, a control system of the tree planting system 1 according to the embodiment will be described with reference to FIG. 5. The cultivating machine 10 includes the control device 20, the cultivated position detecting device 21 (hereinafter suitable referred to as a position detecting device 21), the vehicle body position detecting device 21a (hereinafter suitably referred to as a position detecting device 21a), a communication device 22, and a display device 23. The control device 20, position detecting devices 21, 21a, communication device 22, and display device 23 are connected via a signal line 24. The control device 20, position detecting devices 21, 21a, communication device 22, and display device 23 can exchange information with each other via the signal line 24. The signal line 24 is a signal line of an in-vehicle local network system (LAN) according to a standard such as a controller area network (CAN).

The control device 20 includes: a processing unit 20P that is a processor such as a central processing unit (CPU); a storage unit 20M such as a random access memory (RAM), a read only memory (ROM), or a combination thereof; and an input/output unit 201. The processing unit 20P controls operation of the cultivating machine 10 and executes at least a part of a tree planting method according to the embodiment. The storage unit 20M stores a computer program to implement functions of the processing unit 20P, information necessary for processing performed by the processing unit 20P, and the like. The input/output unit 201 is an interface circuit between the control device 20 and another device.

The position detecting device 21 acquires a signal corresponding to a GNSS radio wave received by the cultivated position detecting antenna 13, and obtains a position of the cultivated position detecting antenna 13, specifically, an actual cultivated position Pda. The position detecting device 21 transmits the obtained actual cultivated position Pda to the management device 3 via the communication device 22 and the communication antenna 17. The management device 3 stores the actual cultivated position Pda in the storage unit 3M.

Figure 11:
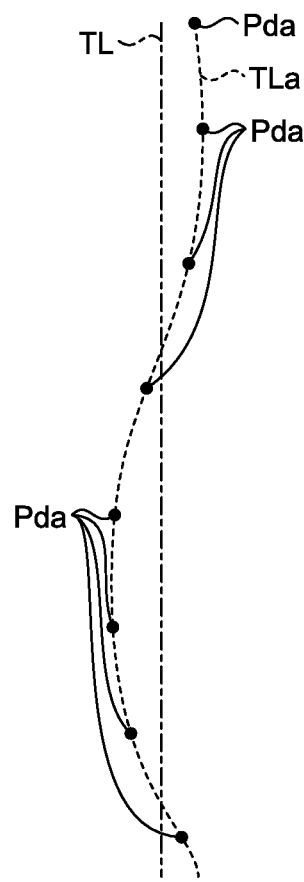
FIG. 11 is a conceptual diagram illustrating a tree planting target line, an actual cultivated position, and an actual cultivated line.
Figure 12:
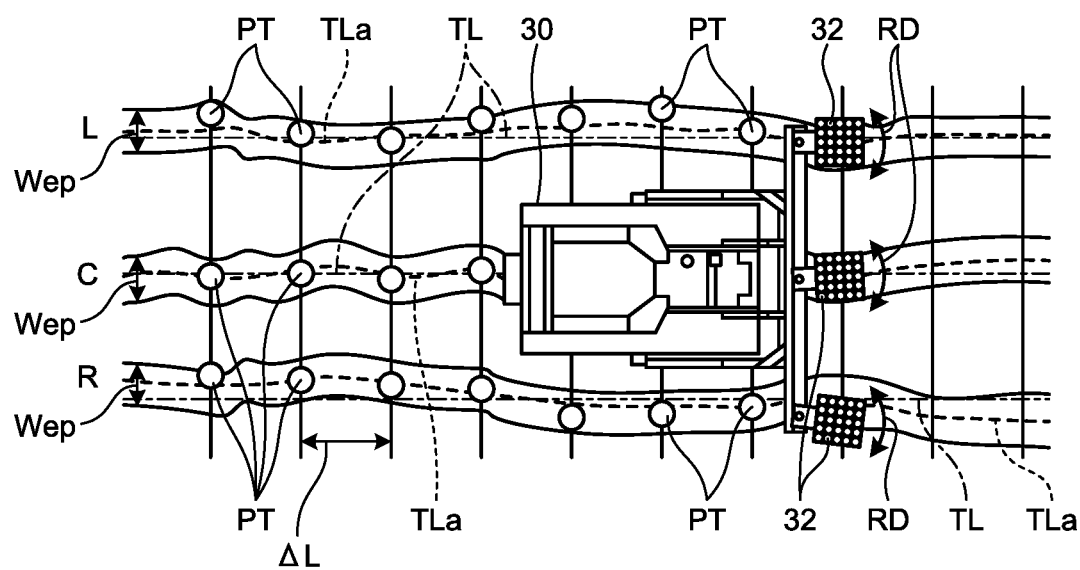
FIG. 12 is a diagram illustrating operation of the tree planting machine during tree planting.

FIG. 11 is a conceptual diagram illustrating a tree planting target line TL, actual cultivated positions Pda, and an actual cultivated line TLa. FIG. 12 is a diagram illustrating operation of the tree planting machine 30 during tree planting. As described above, a trajectory of a plurality of actual cultivated positions Pda acquired along with movement of the cultivating machine 10 is formed like a line. In a case where the cultivating machine 10 is moved along the tree planting target line TL, the trajectory of the plurality of actual cultivated positions Pda is also formed along the tree planting target line TL. As described above, at least one of the plurality of actual cultivated positions Pda and the actual cultivated line TLa that is the trajectory of the plurality of actual cultivated positions Pda is stored in the storage unit 3M of the management device 3. The tree planting target line TL and the actual cultivated line TLa are, for example, two-dimensional or three-dimensional coordinates in the global coordinate system. The actual cultivated line TLa is a set of actual cultivated positions Pda which are two-dimensional or three-dimensional coordinates in the global coordinate system. FIG. 11 is the conceptual diagram, and an interval between actual cultivated positions Pda is not limited and the interval may be shorter than that illustrated in FIG. 11.

The position detecting device 21 of the cultivating machine 10 acquires a signal corresponding to the GNSS radio wave received from a positioning satellite 6 by the cultivated position detecting antenna 13 at a predetermined time cycle, and obtains an actual cultivated position Pda on the basis of the acquired signal. In this case, an actual cultivated position Pda is obtained in each predetermined time cycle. In a case where the predetermined time cycle is 100 ms, ten actual cultivated positions Pda are obtained per second. A plurality of actual cultivated positions Pda can be obtained while the cultivating machine 10 is traveling. Since the actual cultivated line TLa is a set of a plurality of actual cultivated positions Pda, there is a portion where no actual cultivated position Pda exists. A value of such a portion where no actual cultivated position Pda exists can be obtained by interpolation using values of two adjacent actual cultivated positions Pda, Pda, for example. Thus, an actual cultivated line TLa is obtained from a plurality of actual cultivated positions Pda.

The control device 20 of the cultivating machine 10 may preliminarily store actual cultivated positions Pda within a predetermined period in the storage unit 20M, and may read the actual cultivated positions Pda stored in the storage unit 20M after elapse of the predetermined period, and then transmit the same to the management device 3 via the communication device 22 and the communication antenna 17. An example of the predetermined period may be a period during which the cultivating machine 10 completes cultivation work from one end to the other of a tree planting area PA along a tree planting target line TL, but not limited thereto.

In the embodiment, the control device 20 stores, in the storage unit 20M, a position of the cultivated position detecting antenna 13 obtained by the position detecting device 21, specifically, a position of cultivated soil RP. Then, when forming work for the cultivated soil RP by the cultivating machine 10 is finished, the control device 20 may read, from the storage unit 20M, the positions of the cultivated soil RP acquired during a period from the start to the end of the forming work, and transmit the same to the management device 3 via the communication device 22 and the communication antenna 17.

The display device 23 is provided inside the operating room 16 and displays a guidance screen IMG1. The guidance screen IMG1 displays a deviation α between an advancing direction IG1 of the cultivating machine 10 and a tree planting target line TL. The tree planting target line TL is preliminarily set when tree planting is planned, and is stored in the storage unit 20M of the cultivating machine 10 or stored in the storage unit 3M of the management device 3, and acquired from the management device 3 via the communication devices 4 and 22. An operator of the cultivating machine 10 may change the advancing direction of the cultivating machine 10 by watching the guidance screen IMG1 and operating the operating device 16L of the cultivating machine 10 illustrated in FIG. 2 such that the deviation α becomes zero. Using the guidance screen IMG, an operator can easily make the cultivating machine 10 travel along the tree planting target line TL.

The control device 20 can obtain the advancing direction IG1 of the cultivating machine 10 from a position of the vehicle body 10B obtained by the position detecting device 21a. The control device 20 obtains the advancing direction IG1 of the cultivating machine 10 and further obtains the deviation α between the tree planting target line TL and the advancing direction IG1 read from the storage unit 20M. Then, the control device 20 displays, on the display device 23, the tree planting target line TL, obtained deviation α, and advancing direction IG1 as the guidance screen IMG1.

The tree planting machine 30 includes the control device 40, the planting device position detecting device 41 (hereinafter suitable referred to as a position detecting device 41), the vehicle body position detecting device 41a (hereinafter suitably referred to as a position detecting device 41a), a communication device 42, and a display device 43. The control device 40, position detecting devices 41, 41a, communication device 42, and display device 43 are connected via a signal line 44. The control device 40, position detecting devices 41, 41a, communication device 42, and display device 43 can exchange information with each other via the signal line 44. The signal line 24 is a signal line of an in-vehicle LAN according to a standard such as a CAN, for example.

The control device 40 includes: a processing unit 40P that is a processor such as a CPU; the storage unit 40M such as a RAM, a ROM, or a combination thereof; and an input/output unit 401. The processing unit 40P controls operation of the tree planting machine 30 and executes at least a part of the tree planting method according to the embodiment. The storage unit 40M stores a computer program to implement functions of the processing unit 40P, information necessary for processing performed by the processing unit 40P, and the like. The input/output unit 401 is an interface circuit between the control device 40 and another device.

Prior to tree planting work by the planting device 32, the control device 40 acquires an actual cultivated line TLa obtained by the position detecting device 21 of the cultivating machine 10 from the management device 3 via the communication device 42 and the communication antenna 36. In a case where the planting device 32 plants a plant PT in cultivated soil RP, the control device 40 causes the planting device position detecting device 41 to: acquire a signal corresponding to a GNSS radio wave received by the planting device position detecting antenna 33; and obtain a position of the planting device position detecting antenna 33. The position of the planting device position detecting antenna 33 corresponds to a position of the planting device 32. The control device 40 acquires the position of the planting device position detecting antenna 33, specifically, a current position of the planting device 32 obtained and output by the position detecting device 41.

The control device 40 compares the actual cultivated line TLa acquired from the management device 3 with the position of the planting device 32 obtained by the planting device position detecting device 41. Then, the control device 40 actuates the hydraulic cylinder 38 to move the planting device 32 until a distance between the current position of the planting device 32 and the actual cultivated line TLa (hereinafter suitably referred to a positional difference) becomes an allowable value or less. The allowable value is determined on the basis of accuracy in a case of planting a plant PT, but an ideal value is zero. In a case of actuating the hydraulic cylinder 38, the control device 40 adjusts an extension/contraction amount of the hydraulic cylinder 38 by controlling a direction control valve 39 to change a direction and an amount of hydraulic oil supplied to the hydraulic cylinder 38.

When the positional difference becomes the allowable value or less, the control device 40 lowers the extendable portion 32CP of the planting device 32. In a case where a hydraulic pressure of the hydraulic cylinder acquired from a pressure sensor 32sc illustrated in FIG. 5 and applied to extend/contract the extendable portion 32CP becomes a threshold or more, the control device 40 determines that the extendable portion 32CP has contacted the cultivated soil RP. In this case, the control device 40 controls the planting device 32 to plant a plant PT in the cultivated soil RP.

After the plant PT is planted in the cultivated soil RP, the planting device position detecting device 41 may obtain a position of the planting device position detecting antenna 33, specifically, a position of the plant PT planted by the planting device 32, and may transmit the same to the management device 3 via the communication device 42 and the communication antenna 36. A position where the plant PT is planted by the planting device 32 will be suitably referred to as an actual planted position. The control device 40 may preliminarily may store, in the storage unit 40M, a plurality of actual planted positions within a predetermined period, and may collectively read the plurality of actual planted positions from the storage unit 40M after elapse of the predetermined period, and then transmit the same to the management device 3 via the communication device 42 and the communication antenna 36.

The display device 43 is provided inside the operating room 35 and displays a guidance screen IMG2. The guidance screen IMG2 displays a deviation β between an advancing direction IG2 of the tree planting machine 30 and an actual cultivated line TLa. The actual cultivated line TLa is stored in the storage unit 3M of the management device 3. The control device 40 acquires the actual cultivated line TLa from the management device 3 via the communication devices 4 and 42. An operator of the tree planting machine 30 may change the advancing direction of the tree planting machine 30 by watching the guidance screen IMG2 and operating the operating device 35L of the tree planting machine 30 illustrated in FIG. 2 such that the deviation β becomes zero. Using the guidance screen IMG2, an operator can easily make the tree planting machine 30 travel along the actual cultivated line TLa. The display device 43 may also display a tree planting target line TL instead of the actual cultivated line TLa. In this case, an operator may operate the operating device 35L of the tree planting machine 30 such that the advancing direction of the tree planting machine 30 follows the tree planting target line TL.

The control device 40 can obtain the advancing direction IG2 of the tree planting machine 30 from a position of the planting device position detecting antenna 33 or the vehicle body position detecting antenna 33a acquired from the position detecting device 41 or the position detecting device 41a. The control device 40 obtains the advancing direction IG2 of the tree planting machine 30 and further obtains the deviation β between the advancing direction IG2 and the tree planting target line TL read from the storage unit 40M. Then, the control device 40 displays, on the display device 43, the tree planting target line TL, obtained deviation β, and advancing direction IG2 as the guidance screen IMG2.

In the embodiment, the tree planting machine 30 has the three planting devices 32. The tree planting machine 30 plants the plants PT in three ridges H or three furrows S at the same time out of a plurality of ridges H or furrows S. In the example illustrated in FIG. 12, the tree planting machine 30 plants the plants PT on actual cultivated lines TLa of the ridges H or the furrows S corresponding to a row L, a row C, and a row L.

The tree planting machine 30 travels along an actual cultivated line TLa in the center row C out of the row L, row C, and row L. Therefore, in the display device 43 illustrated in FIG. 5 displays, as an actual cultivated line TLa on the guidance screen IMG2, the actual cultivated line TLa in the center row C out of the row L, row C and row L where the plants PT are to be planted. An operator operates the tree planting machine 30 while visually checking the actual cultivated line TLa, advancing direction IG2, and deviation β displayed on the guidance screen IMG2 such that the deviation β becomes zero.

The management device 3 is installed inside the management facility 2. The management device 3 includes: a processing unit 3P that is a processor such as a CPU; the storage unit 3M such as a RAM, a ROM, or a combination thereof; and an input/output unit 31. The processing unit 3P manages information transmitted from the cultivating machine 10 and the tree planting machine 30, and also manages information to be transmitted to the cultivating machine 10 and the tree planting machine 30.

For example, the management device 3 stores, in the storage unit 3M serving as a storage device, at least one of an actual cultivated position Pda and an actual cultivated line TLa transmitted from the cultivating machine 10 and transmits, to the tree planting machine 30, at least one of the actual cultivated position Pda and actual cultivated line TLa stored in the storage unit 3M in response to a request from the tree planting machine 30. Additionally, the management device 3 transmits the tree planting target line TL stored in the storage unit 3M to the cultivating machine 10 and the tree planting machine 30.

The communication device 4 is connected to the input/output unit 31 of the management device 3. The management device 3 exchanges information with the cultivating machine 10 and the tree planting machine 30 via the communication device 4 and the antenna 5.

At least one of the actual cultivated position Pda and the actual cultivated line TLa transmitted from the cultivating machine 10 is stored in the storage unit 3M as a first database DBA, for example. In a case where the tree planting machine 30 transmits an actual planted position to the management device 3, the actual planted position is stored in the storage unit 3M as a second database DBB, for example.

<Exemplary Processing During Tree Planting>

Figure 13:
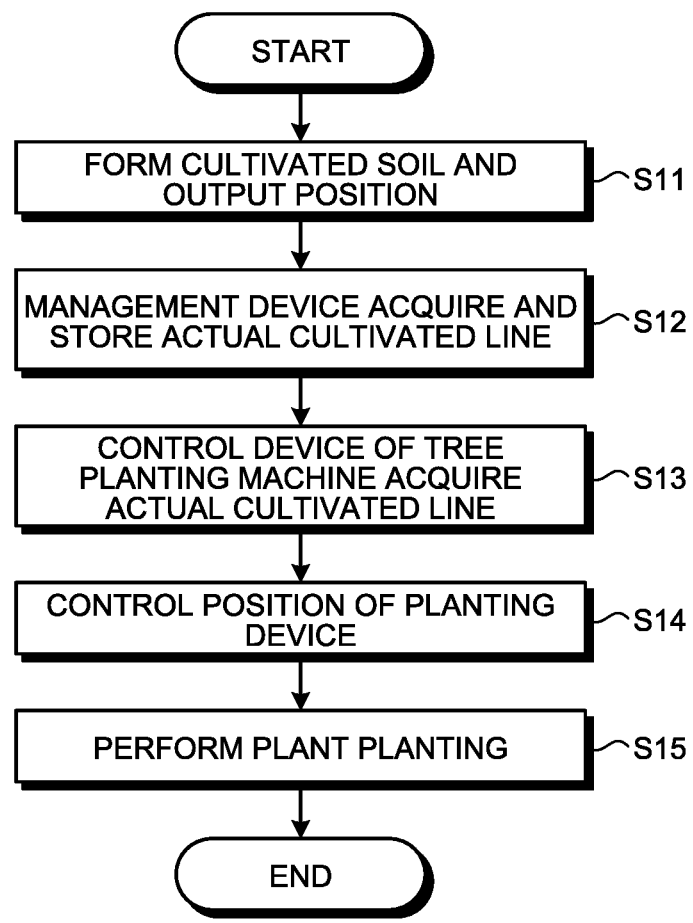
FIG. 13 is a flowchart illustrating exemplary processing of the tree planting system during tree planting according to the embodiment.

FIG. 13 is a flowchart illustrating exemplary processing of the tree planting system 1 during tree planting according to the embodiment. The processing illustrated in the flowchart of FIG. 13 also corresponds to procedures of the tree planting method according to the embodiment. In the following description, a description will be provided by exemplifying a case where the control device 40 of the tree planting machine 30 controls a position of the tree planting machine 32 by using an actual cultivated line TLa, but the control device 40 may also use an actual cultivated position Pda instead of the actual cultivated line TLa.

In step S11, the cultivating machine 10 illustrated in FIG. 1 forms cultivated soil RP, and the position detecting device 21 of the cultivating machine 10 obtains and outputs an actual cultivated position Pda cultivated by the cultivating device 12. The communication device 22 outputs, specifically, transmits the actual cultivated position Pda output from the position detecting device 21 to the management device 3. As described above, the control device 20 preliminarily stores, in the storage unit 20M of the control device 20, a plurality of actual cultivated positions Pda within a predetermined period, and outputs, specifically, transmits the same to the management device 3 via the communication device 22 after elapse of the predetermined period. Since a trajectory of actual cultivated positions Pda acquired along with movement of the cultivating machine 10 is formed like a line, the storage unit 3M of the management device 3 stores an actual cultivated line TLa that is the trajectory of the actual cultivated positions Pda.

As illustrated in FIGS. 3 and 4, a plurality of ridges H or a plurality of furrows S each centering an actual cultivated line TLa is formed by cultivation work by the cultivating machine 10. As illustrated in FIGS. 3 and 4, the actual cultivated line TLa, which is the center line of the formed ridges H or furrows S, has a portion deviated from a tree planting target line TL due to influence of remaining stumps, rocks, and the like.

In step S12, the management device 3 acquires the actual cultivated line TLa transmitted from the cultivating machine 10 via the communication device 4, and stores the same in the storage unit 3M serving as the storage device. In step S13, the control device 40 of the tree planting machine 30 acquires, via the communication device 42, the actual cultivated line TLa stored in the management device 3.

In step S14, the control device 40 controls a position of the planting device 32 on the basis of the actual cultivated line TLa acquired in step S13 and a current position of the planting device 32 obtained by the position detecting device 41. With this control, the planting device 32 is rotated in the direction of the arrow RD illustrated in FIG. 9, and the position thereof in the width direction of the tree planting machine 30 is changed.

When a positional difference that is a difference between the position of the cultivated soil RP and the position of the planting device 32 obtained by the position detecting device 41 becomes the allowable value or less, the planting device 32 plants a plant PT in the cultivated soil RP in step S15, and then a series of cultivation work and tree planting work are finished. In the embodiment, the positional difference is set to zero.

When the tree planting work is finished, the control device 40 of the tree planting machine 30 may output, specifically, transmit the position of the planting device 32 to the management device 3 as an actual planted position that is the position when the plant PT is planted, and here, the position of the planting device 32 is obtained by the position detecting device 41 when the positional difference becomes zero. Additionally, the tree planting machine 30 may include a fertilizer system and a sprinkler system, and the tree planting machine 30 may simultaneously perform fertilization and watering for an actual planted position when the planting work is finished.

Figure 14:
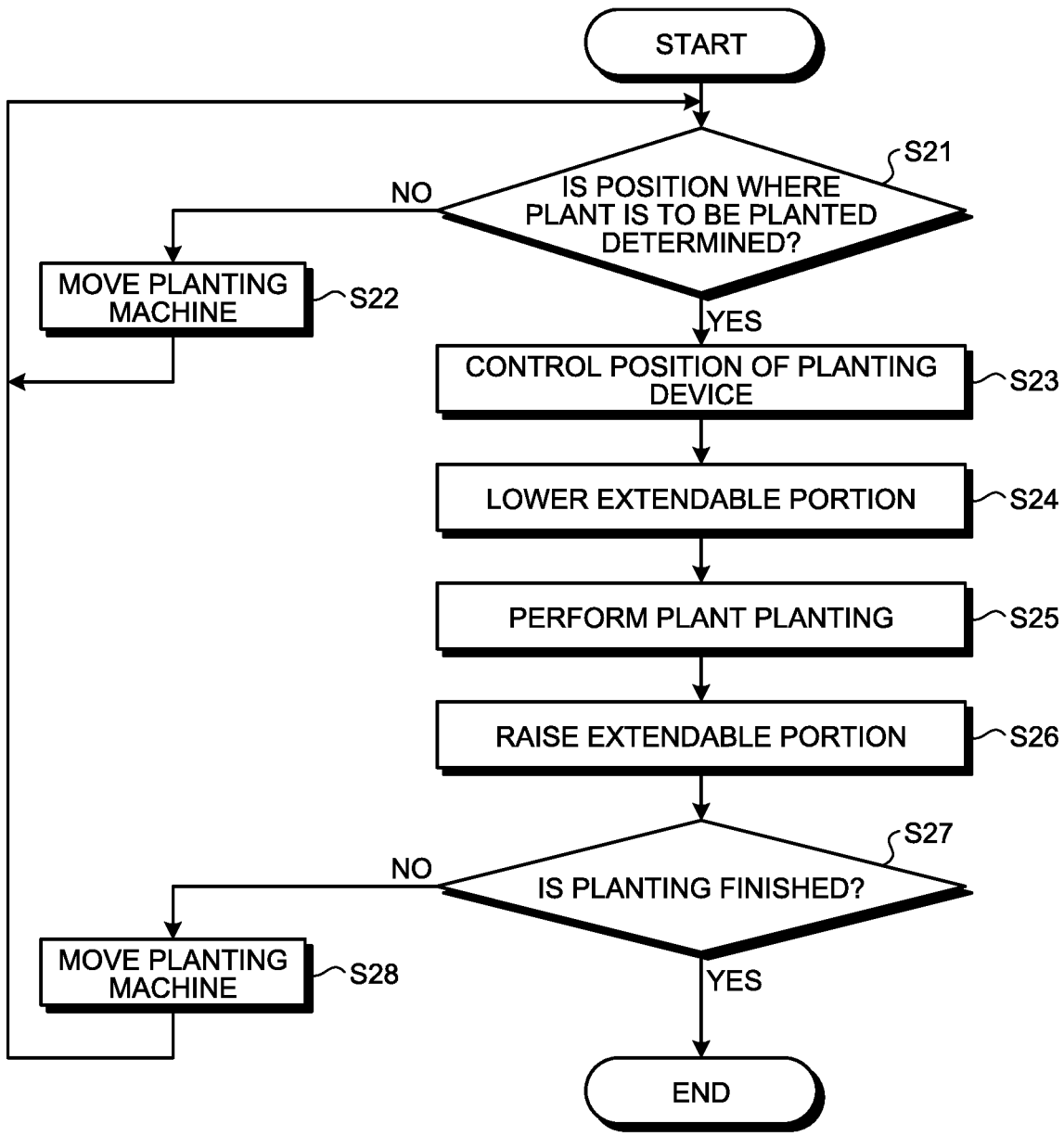
FIG. 14 is a flowchart illustrating exemplary processing when the tree planting machine plants a plant.

FIG. 14 is a flowchart illustrating exemplary processing when the tree planting machine 30 plants a plant PT. In step S21, the control device 40 determines a position where a plant PT is to be planted. In the embodiment, a plant PT is planted at an interval of a distance ΔL as illustrated in FIG. 12. The distance ΔL is, for example, in a range from 1 m to 3 m, but not limited thereto.

In a case of initially planting a plant PT, the control device 40 determines that a position where the plant PT is to be planted when start inputting for tree planting is received from an operator of the tree planting machine 30. In a case of planting a plant PT after the second time, the control device 40 determines a position where the plant PT is to be planted when the tree planting machine 30 advances by the distance ΔL from the position where the planting device 32 has planted a plant PT last. For example, the control device 40 can obtain, from the number of times a sprocket or wheels of the second traveling device 31 is rotated, a distance which the tree planting machine 30 has advanced, and also can obtain, from a position detected by the position detecting device 41a, a distance which the tree planting machine 30 has advanced.

In a case where a position where a plant PT is to be planted is not determined (step S21, No), the control device 40 controls the second traveling device 31 to move the tree planting machine 30 until the tree planting machine reaches a position where the plant PT is to be planted in step S22. In a case where a position where a plant PT is to planted is determined (step S21, Yes), the control device 40 stops the second traveling device 31 and further controls the position of the planting device 32 while acquiring the position of the planting device 32 obtained by the position detecting device 41 until a positional difference becomes the allowable value or less in step S23.

When the positional difference becomes the allowable value or less, the control device 40 lowers the extendable portion 32CP of the planting device 32 in step S24. In a case where a hydraulic pressure acquired from the pressure sensor 32sc illustrated in FIG. 5 becomes the threshold or less, the control device 40 determines that the extendable portion 32CP has contacted the cultivated soil RP. The pressure sensor 32sc detects a pressure of the hydraulic oil of the hydraulic cylinder that extends/contracts the extendable portion 32CP. In other words, the hydraulic pressure detected by the pressure sensor 32sc is the hydraulic pressure of the hydraulic cylinder that extends/contracts the extendable portion 32CP. When the hydraulic pressure acquired from the pressure sensor 32sc exceeds the threshold, the control device 40 transmits a command to plant a plant PT to the planting device 32 in step S25. Upon receipt of the command, the planting device 32 plants the plant PT in step S25.

When the plant PT is planted, the control device 40 transmits, to the planting device 32, a command to raise the extendable portion 32CP in step S26. Upon receipt of this command, the planting device 32 raises the extendable portion 32CP. After the extendable portion 32CP is raised, the control device 40 determines, in step S27, whether tree planting is finished, specifically, whether all the planting work on the same actual cultivated line TLa is completed. When tree planting is finished (step S27, Yes), the control device 40 finishes the tree planting processing. In a case where tree planting is not finished (step S27, No), the control device 40 controls the second traveling device 31 to move, specifically, advance the tree planting machine 30 again by the distance ΔL from the current position in step S28, and then the processing returns to determination in step S21.

In step S24, the control device 40 determines whether the extendable portion 32CP has contacted the cultivated soil RP by using a detection value of the pressure sensor 32sc, but not limited thereto. After step S24, the control device 40 may also determine whether the extendable portion 32CP has contacted the cultivated soil RP by using a distance from a tip of the extendable portion 32CP to the cultivated soil RP acquired by a distance sensor attached to the extendable portion 32CP, for example. During the processing from step S22 to step S28, control for the position of the planting device 32, that is the processing in step S14 in FIG. 13, is executed.

An uncultivated soil SR is a rugged land where tree stumps, rocks, and the like exist and often has a topography not flat, and therefore, a deviation is caused between a tree planting target line TL and an actual cultivated line TLa as illustrated in FIGS. 3, 4, and 12. In a case where a plant PT is not planted in a properly cultivated place, there may be possibility that sufficient growth cannot be expected. A width Wep illustrated in FIG. 12 defines a range in which plants PT are needed to be planted considering growth of the plants PT. For example, the width Wep in a case of centering an actual cultivated line TLa is about ±25 cm at a maximum, and the tree planting machine 30 is required to have accuracy enough to plant the plants PT in this range.

In the embodiment, since the position of the planting device 32 is controlled by the control device 40 so as to be located substantially on the actual cultivated line TLa, the planting plants PT can be planted with high efficiency and also planting accuracy can be secured.

After the tree planting work is finished, an actual planted position is not needed to be transmitted to the management device 3. However, with transmission of an actual planted position to the management device 3, the actual planted position can be used in a wide range, for example, the actual planted position may be utilized as positional information in order to automate fertilization and watering after planting or utilized as information to manage a growing state after tree planting.

In a case of transmitting an actual planted position to the management device 3, for example, the control device 40 may image a planting state of a plant PT with an imaging device and transmit the image to the management device 3 in a manner correlated to the actual planted position. Furthermore, in a case of providing fertilizer, water, and the like to a plant PT at the time of planting the plant PT, the control device 40 may also transmit, to the management device 3, information related to growth of the plant PT, such as a kind of fertilizer, an amount of fertilizer, and an amount of water in a manner correlated to an actual planted position. With this processing, a plant PT can be identified at an actual planted position, and the information related to growth of the plant PT can be managed.

<Tree Planting in Sloping Ground>

Figure 15:
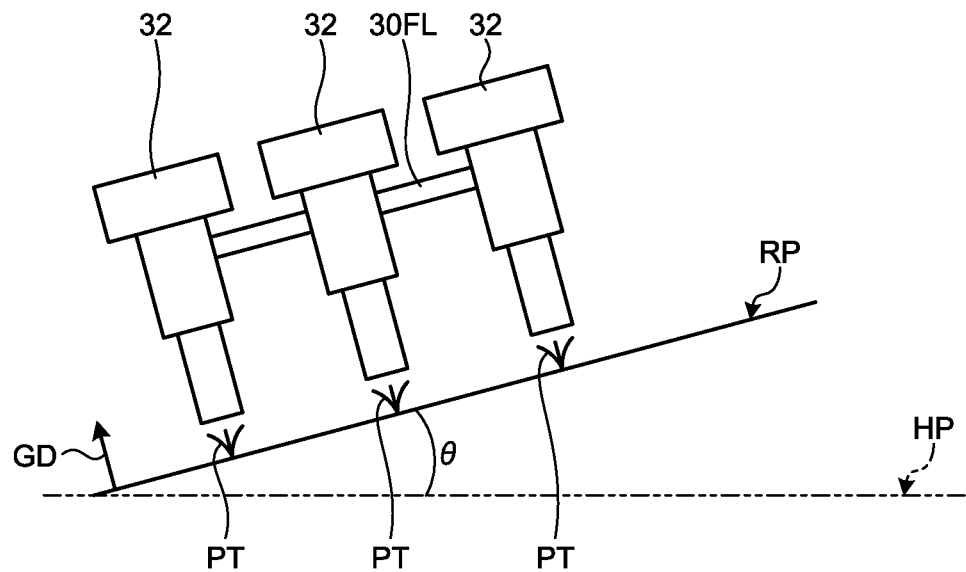
FIG. 15 is a view illustrating a state in which the planting device plants a plant in a sloping ground.

FIG. 15 is a view illustrating a state in which the planting device 32 plants a plant PT in a sloping ground. In a case where there is a slope inside a tree planting area PA with respect to a horizontal plane HP (the ground slopes at an angle θ in an example illustrated in FIG. 15), the planting device 32 attached to the frame 30FL is also inclined with respect to the horizontal plane HP. Therefore, when a plant PT is planted in sloping cultivated soil RP, a growth direction GD of the plant PT may be inclined with respect to the horizontal plane HP. The horizontal plane HP is a plane orthogonal to a direction in which gravity acts, specifically, a vertical direction.

Figure 16:
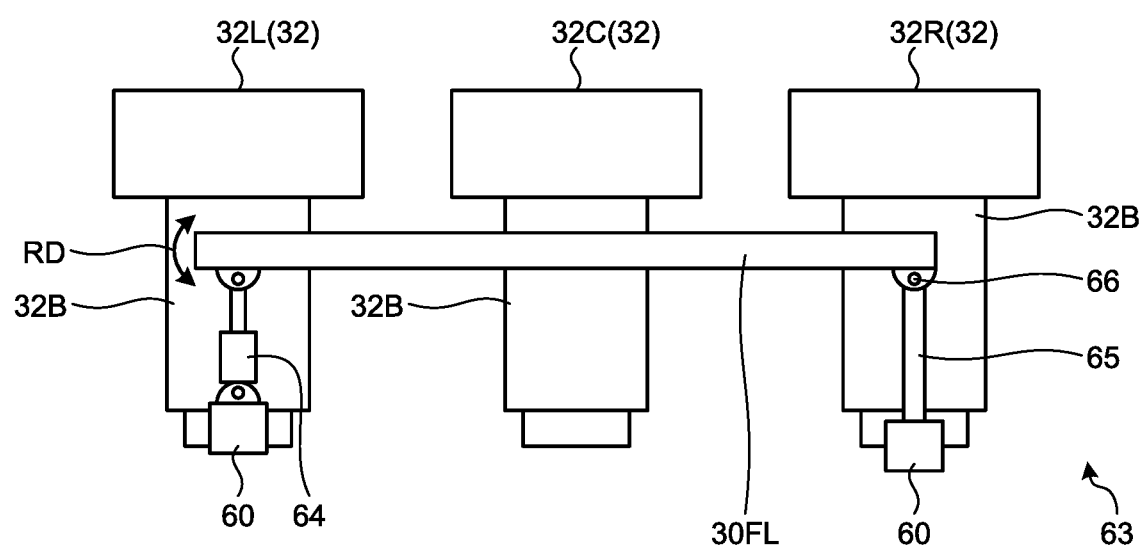
FIG. 16 is a view illustrating an exemplary inclination mechanism to incline the planting device.

FIG. 16 is a view illustrating an exemplary inclination mechanism that inclines planting devices 32. The inclination mechanism 63 is provided with a hydraulic cylinder 64 and a support 65 between the arm 60 attached to the tree planting machine 30 illustrated in FIG. 2 and the frame 30FL supporting the planting devices 32. More specifically, the hydraulic cylinder 64 is provided between one of the two arms 60 and one end of the frame 30FL, and the support 65 is provided between the other one of the two arms 60 and the other end of the frame 30FL. The support 65 and the frame 30FL are connected by a pin 66. When the hydraulic cylinder 64 is extended/contracted, the frame 30FL is rotated around the pin 66, and therefore, the inclination mechanism 63 can incline the planting devices 32 with respect to the horizontal plane HP.

Figure 17:
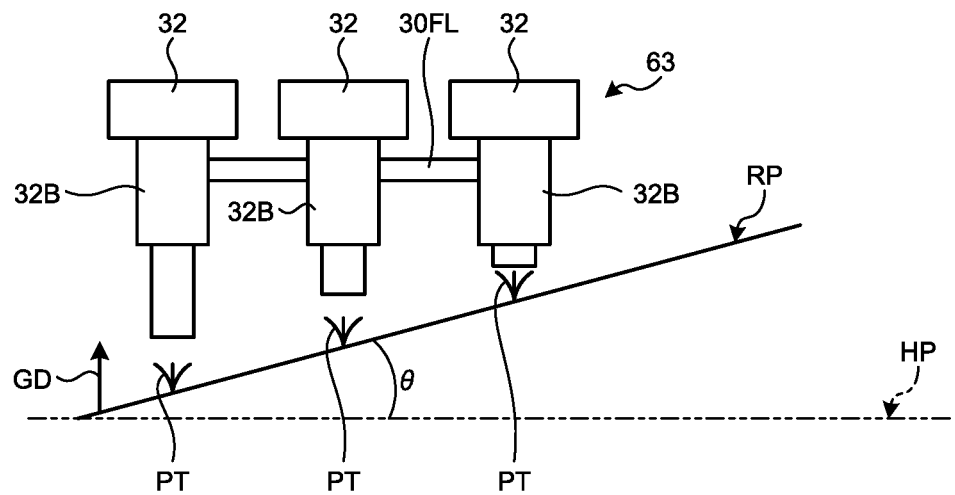
FIG. 17 is a view illustrating a state in which the planting device plants a plant in a sloping ground.

FIG. 17 is a view illustrating a state in which each planting device 32 plants a plant PT in a sloping ground. The inclination mechanism 63 can make the growth direction GD of the plant PT parallel to the vertical direction by making an extending direction of a main body portion 32B of the planting device 32 parallel to the vertical direction by adjusting a length of the hydraulic cylinder 64 in accordance with the angle θ between the horizontal plane HP and a cultivated soil RP. Therefore, a more appropriate environment to grow the plants PT can be provided.

The inclination mechanism 63 is not limited to the structure described above. For example, each planting device 32 may also have a structure that is rotated around an axis orthogonal to the extending/contacting direction of the extendable portion 32CP and also orthogonal to the frame 30FL. Additionally, the planting device 32 may be inclined by utilizing a tilt mechanism included in a bulldozer.

Before planting a plant PT, the growth direction GD of the plant PT may be made parallel to the vertical direction by an operator controlling a posture of the inclination mechanism 63 to make the extending direction of the main body portion 32B of the planting device 32 parallel to the vertical direction. Additionally, a plant PT may be planted after a posture of the planting device 32 is detected by an inertial measurement unit (IMU) attached to the planting device 32, and the control device 40 controls the posture of the inclination mechanism 63 such that the posture of the planting device 32 becomes parallel to the horizontal plane HP. With this procedure, planting work of a plant PT can be easily performed because an operator does not need to control the posture of the inclination mechanism 63.

<Function to Detect Position of Stump and the Like>

Figure 18:
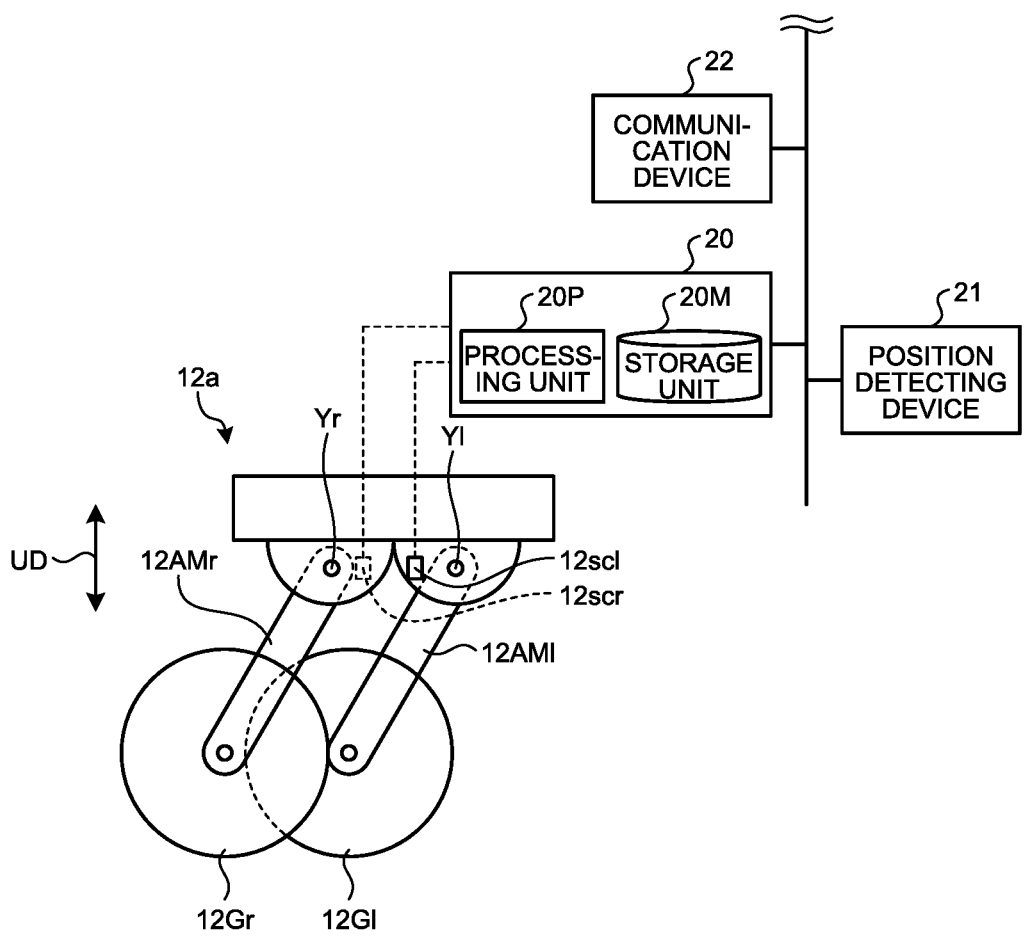
FIG. 18 is a diagram illustrating a cultivating device that detects a stump and the like in uncultivated soil.
Figure 19:
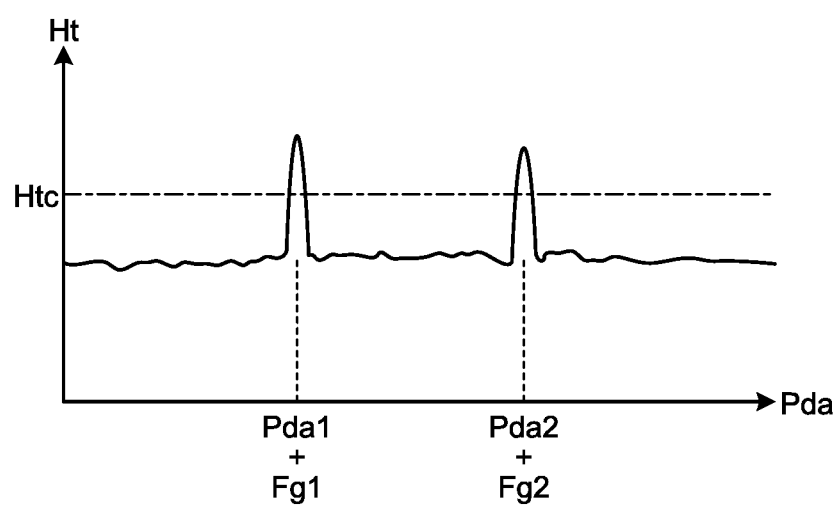
FIG. 19 is a diagram to describe a function of the cultivating device to detect a stump and the like in uncultivated soil.

FIG. 18 is a diagram illustrating a cultivating device 12a that detects a stump and the like in uncultivated soil SR. FIG. 19 is a diagram to describe a function of the cultivating device 12a that detects a stump and the like in uncultivated soil SR. The cultivating device 12a supports the cultivation discs 12Gl, 12Gr with arms 12AMl, 12AMr. Since the arms 12AMl, 12AMr are rotated around axes Yl, Yr respectively, the cultivation discs 12Gl, 12Gr are also rotated around the axes Yl, Yr respectively. Angle sensors 12scl, 12scr to detect rotated angles of the arms 12AMl, 12AMr are attached to bases of the arms 12AMl, 12AMr, specifically, the vicinity of the axes Yl, Yr respectively.

Vertical moved amounts of the cultivation discs 12Gl, 12Gr (in a direction indicated by an arrow UD in FIG. 18) can be obtained from: rotated angles of the arms 12AMl, 12AMr; and dimensions of the arms 12AMl, 12AMr detected by the angle sensors 12scl and 12scr. The control device 20 of the cultivating machine 10 acquires detection values of the angle sensors 12scl, 12scr and obtains the vertical moved amounts of the cultivation discs 12Gl, 12Gr.

When there are stumps and the like that could not be removed by the crushing disc 12D, the cultivation discs 12Gl, 12Gr runs onto the stumps and the like, and the vertical moved amounts of the cultivation discs 12Gl, 12Gr are increased. In a case where the vertical moved amounts of the cultivation discs 12Gl and 12Gr exceed a threshold, the control device 20, more specifically, the processing unit 20P determines that the cultivation discs 12Gl, 12Gr have run onto the stumps and the like, and turns on a determination flag Fg. The control device 20 correlates the determination flag Fg to an actual cultivated position Pda detected by the position detecting device 21 at the timing when the vertical moved amounts of the cultivation discs 12Gl, 12Gr become the threshold or more, and then the control device 20 outputs, specifically, transmits the correlated determination flag Fg and actual cultivated position Pda to the management device 3 illustrated in FIG. 2 via the communication device 22.

In a case where the cultivation discs 12Gl, 12Gr run onto stumps and the like, it can be considered that the stumps and the like that could not be removed by the crushing disc 12D still remain in the cultivated soil RP. Even though a plant PT is planted in such a place where the stumps and the like remain, the plant PT may not take root in soil. Therefore, the tree planting machine 30 determines that stumps and the like remain in the actual cultivated position Pda correlated to the determination flag Fg, and plants a plant PT while avoiding the place determined to have the remaining stumps and the like.

FIG. 19 illustrates a relation between a vertical moved amount Ht of each of the cultivation discs 12Gl, 12Gr (hereinafter suitably referred to as a vertical moved amount Ht) and an actual cultivated position Pda. In this example, the vertical moved amount Ht is a threshold Htc or more at actual cultivated positions Pda1, Pda2. When the vertical moved amount Ht becomes the threshold Htc or more, the control device 20 turns on determination flags Fg1, Fg2 and stores the same in the storage unit 20M in a manner correlated to the actual cultivated positions Pda1, Pda2. The control device 20 transmits a plurality of actual cultivated positions Pda to the management device 3 illustrated in FIG. 2 in a manner correlating the determination flags Fg1, Fg2 to the actual cultivated positions Pda1, Pda2 respectively. When the plurality of actual cultivated positions Pda is stored in the storage unit 3M as an actual cultivated line TLa, the management device 3 stores the same in a manner respectively correlating the determination flags Fg1, Fg2 to the actual cultivated positions Pda1, Pda2 where the vertical moved amount Ht becomes the threshold Htc or more.

Prior to tree planting work, the tree planting machine 30 acquires an actual cultivated line TLa from the management device 3, and at this point, the tree planting machine 30 also acquires the determination flags Fg1, Fg2 correlated to the actual cultivated positions Pda1, Pda2 where the vertical moved amount Ht becomes the threshold Htc or more In a case of planting a plant PT in each of the actual cultivated positions Pda1, Pda2 correlated to the determination flags Fg1, Fg2, the tree planting machine 30 plants the plant PT while avoiding the actual cultivated positions Pda1, Pda2. More specifically, the control device 40 executes any one of processing: changing the position of the planting device 32 so as to avoid the actual cultivated positions Pda1, Pda2; and moving the second traveling device 31 forward or rearward so as to avoid the actual cultivated positions Pda1, Pda2. With this processing, the tree planting machine 30 can plant the plant PT while avoiding the place where stumps and the like remain.

A determining method on whether stumps and the like remain is not limited to the method using the vertical moved amount Ht. For example, the control device 40 may determine whether stumps and the like remain by using tractive force of the second traveling device 31 included in the tree planting machine 30. In this case, the control device 40 generates a determination flag Fg at the timing when the tractive force of the second traveling device 31 becomes a threshold or more. Then, the control device 40 correlates the determination flag Fg to an actual cultivated position Pda detected by the position detecting device 21 at the timing when the tractive force of the second traveling device 31 becomes the threshold or more, and then outputs, specifically, transmits the correlated determination flag Fg and actual cultivated position Pda to the management device 3 illustrated in FIG. 2 via the communication device 22.

As described above, the cultivating machine 10 that executes cultivation work and the tree planting machine 30 to execute planting work different from the cultivating machine 10 are used. Additionally, in the embodiment, a position of the planting device 32 of the tree planting machine 30 is automatically controlled on the basis of: at least one of an actual cultivated position Pda and an actual cultivated line TLa obtained by the cultivated position detecting device 21 of the cultivating machine 10; and a current position of the planting device 32 obtained by the planting device position detecting device 41 of the tree planting machine 30, specifically, a position of the planting device 32 at the timing when a plant PT is planted. Furthermore, in the embodiment, a deviation between a tree planting target line TL set at the time of planning tree planting and an advancing direction of each of the cultivating machine 10 and the tree planting machine 30 is displayed on each of the display devices 23, 43 inside the operating rooms 16, 35, respectively. Furthermore, in the embodiment, advancing and stopping of the tree planting machine 30 in the planting work is automatically controlled. With this processing, in the embodiment, plants PT can be efficiently and easily planted along a tree planting target line TL, and efficiency of tree planting work is improved in promoting mechanization of the tree planting work in vast land.

In the embodiment, the cultivating machine 10 and the tree planting machine 30 are manned vehicles each traveling in accordance with operation of an operator, but may also be unmanned vehicles each traveling by automatic operation using a global positioning system (GPS), inertial navigation, or the like. In this case, the control device 20 of the cultivating machine 10 and the control device 40 of the tree planting machine 30 make the cultivating machine 10 and the tree planting machine 30 travel along an actual cultivated line TLa by using a position of an own vehicle obtained by the GPS or a position of the own vehicle obtained by inertial navigation.

While the present embodiment has been described above, note that the present embodiment is not limited to the above-described content. Additionally, the components described above may include components readily conceivable by those skilled in the art, components substantially identical, and components included in a so-called equivalent range. Additionally, the components described above can be suitably combined. Furthermore, various kinds of omission, replacement, and modification can be made in the components within the scope without departing from the gist of the present embodiment.

For example, in the embodiment, a global coordinate system is used as a coordinate system of each of an actual cultivated position Pda, an actual cultivated line TLa, and a tree planting target line TL, but not limited thereto. For example, the coordinate system of each of the actual cultivated position Pda, actual cultivated line TLa, and tree planting target line TL may also be a coordinate system uniquely set for a tree planting area PA.

In the embodiment, the control device 20 of the cultivating machine 10 may generate an actual cultivated line TLa from a plurality of actual cultivated positions Pda and transmit the same to the management device 3. Additionally, the management device 3 may generate an actual cultivated line TLa from a plurality of actual cultivated positions Pda acquired from the cultivating machine 10. Furthermore, the control device 40 of the tree planting machine 30 may generate an actual cultivated line TLa from a plurality of actual cultivated positions Pda acquired from the management device 3. In the embodiment, at least one of an actual cultivated position Pda and an actual cultivated line TLa is transmitted to the tree planting machine 30 after once stored in the storage unit 3M of the management device 3, but may also be transmitted directly to the tree planting machine 30.

REFERENCE SIGNS LIST

1 TREE PLANTING SYSTEM
2 MANAGEMENT FACILITY
3 MANAGEMENT DEVICE
4, 22 COMMUNICATION DEVICE
5 ANTENNA
6 POSITIONING SATELLITE
10 CULTIVATING MACHINE
10B, 30B VEHICLE BODY
11 FIRST TRAVELING DEVICE
12, 12a CULTIVATING DEVICE
12B MAIN BODY
12C HYDRAULIC CYLINDER
12D CRUSHING DISC
12Gl, 12Gr CULTIVATION DISC

13 CULTIVATED POSITION DETECTING ANTENNA
13a VEHICLE BODY POSITION DETECTING ANTENNA
14 BLADE
16, 35 OPERATING ROOM
16S, 35S OPERATOR'S SEAT
16L, 35L OPERATING DEVICE
17, 36 COMMUNICATION ANTENNA
20, 40 CONTROL DEVICE
21 CULTIVATED POSITION DETECTING DEVICE (POSITION DETECTING DEVICE)
21a VEHICLE BODY POSITION DETECTING DEVICE (POSITION DETECTING DEVICE)
22, 42 COMMUNICATION DEVICE
23, 43 DISPLAY DEVICE
30FL FLAME
30, 30a, 30b, 30c, 30d, 30e TREE PLANTING MACHINE
31 SECOND TRAVELING DEVICE
32, 32a, 32L, 32C, 32R PLANTING DEVICE
32B, 32Ba MAIN BODY PORTION
32S PLANT HOLDING PORTION
32CP EXTENDABLE PORTION
33 PLANTING DEVICE POSITION DETECTING ANTENNA
33a VEHICLE BODY POSITION DETECTING ANTENNA
41 PLANTING DEVICE POSITION DETECTING DEVICE (POSITION DETECTING DEVICE)
41a VEHICLE BODY POSITION DETECTING DEVICE (POSITION DETECTING DEVICE)
50 LIFTING MECHANISM
PA TREE PLANTING AREA
Pda ACTUAL CULTIVATED POSITION
PT PLANT
RP CULTIVATED SOIL
SR UNCULTIVATED SOIL
TL TREE PLANTING TARGET LINE

The invention claimed is:

1. A tree planting system comprising a first machine, a management device, and a second machine,
the first machine including:
a cultivating device configured to cultivate soil where a plant for tree planting is to be planted;
a first traveling device configured to travel together with the cultivating device; and
a cultivated position detecting device configured to obtain by and output a plurality of actual cultivated positions which are positions corresponding to positions of the cultivating device while the cultivating device travels together with the first traveling device and cultivates the soil,
the management device storing the plurality of actual cultivated positions,
the second machine including:
a planting device configured to plant the plant in the soil cultivated by the cultivating device;
a second traveling device configured to travel together with the planting device;
a planting device position detecting device configured to obtain a position of the planting device; and
a control device configured to control a position of the planting device on the basis of the plurality of actual cultivated positions acquired from the management device and a position of the planting device obtained by the planting device position detecting device at a timing when the plant is planted.

2. The tree planting system according to claim 1, wherein the control device controls a position of the planting device on the basis of: an actual cultivated line that is a trajectory of the plurality of actual cultivated positions acquired from the management device; and the position of the planting device obtained by the planting device position detecting device at the timing when the plant is planted.

3. The tree planting system according to claim 1, wherein a detector used for the cultivated position detecting device to obtain the actual cultivated position is attached to the cultivating device.

4. The tree planting system according to claim 1, wherein
the planting device position detecting device obtains and outputs an actual planted position that is a position where the plant is planted, and
the management device stores the actual planted position obtained by the planting device position detecting device.

5. The tree planting system according to claim 1, wherein a detector used for the planting device position detecting device to detect a position is attached to the planting device.

6. The tree planting system according to claim 1, further comprising:
a cultivated position detecting antenna configured to receive, from a positioning satellite of a Global Navigation Satellite Systems (GNSS), a GNSS signal in order to detect the position of the cultivating device,
wherein the cultivated position detecting device is configured to acquire the signal received by the cultivated position detecting antenna and obtain actual cultivated positions using the received signal.

7. The tree planting system according to claim 6,
wherein the cultivated position detecting antenna is attached to the cultivating device.

8. A tree planting method comprising:
obtaining and outputting a plurality of actual cultivated positions corresponding, while cultivating soil in which a plant for tree planting is to be planted, to the cultivated positions;
storing the plurality of actual cultivated positions; and
acquiring the stored plurality of actual cultivated positions, and controlling a position of a device that plants the plant on the basis of: a cultivated line that is a trajectory of the plurality of actual cultivated positions; and a position of a planting device that plants the plant at a timing when the plant is planted.

9. The planting method according to claim 8, comprising obtaining an actual planted position that is a position where the plant is planted.

* * * * *